United States Patent
Yuan

(10) Patent No.: US 10,586,551 B2
(45) Date of Patent: Mar. 10, 2020

(54) SPEECH SIGNAL PROCESSING METHOD AND APPARATUS

(71) Applicant: Tencent Technology (Shenzhen) Company Limited, Shenzhen (CN)

(72) Inventor: Haolei Yuan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 181 days.

(21) Appl. No.: 15/691,300

(22) Filed: Aug. 30, 2017

(65) Prior Publication Data
US 2017/0365270 A1 Dec. 21, 2017

Related U.S. Application Data

(63) Continuation-in-part of application No. PCT/CN2016/083622, filed on May 27, 2016.

(30) Foreign Application Priority Data

Nov. 4, 2015 (CN) .......................... 2015 1 0741057

(51) Int. Cl.
  *G10L 15/20* (2006.01)
  *G10L 21/02* (2013.01)
  (Continued)

(52) U.S. Cl.
  CPC ...... *G10L 21/0205* (2013.01); *G10L 21/0232* (2013.01); *G10L 21/0364* (2013.01);
  (Continued)

(58) Field of Classification Search
  None
  See application file for complete search history.

(56) References Cited

U.S. PATENT DOCUMENTS

| | | | | |
|---|---|---|---|---|
| 5,661,813 A | * | 8/1997 | Shimauchi | H04M 9/082 381/66 |
| 6,078,567 A | * | 6/2000 | Traill | H04B 3/23 370/289 |

(Continued)

FOREIGN PATENT DOCUMENTS

| | | |
|---|---|---|
| CN | 1315032 A | 9/2001 |
| CN | 1655230 A | 8/2005 |

(Continued)

OTHER PUBLICATIONS

Tencent Technology, Written Opinion, PCT/CN2016/083622, dated Aug. 17, 2016, 8 pgs.

(Continued)

*Primary Examiner* — Richard Z Zhu
(74) *Attorney, Agent, or Firm* — Morgan, Lewis & Bockius LLP

(57) ABSTRACT

A speech signal processing method is performed at a terminal device, including: obtaining a recorded signal and a to-be-output speech signal, the recorded signal including a noise signal and an echo signal; calculating a loop transfer function according to the recorded signal and the speech signal; calculating a power spectrum of the echo signal and a power spectrum of the noise signal according to the recorded signal, the speech signal, and the loop transfer function; calculating a frequency weighted coefficient according to the two power spectra of the echo signal and the noise signal; adjusting a frequency amplitude of the speech signal based on the frequency weighted coefficient; and outputting the adjusted speech signal to a speaker electrically coupled to the terminal device. As such, the frequency amplitude of the speech signal is automatically adjusted according to the relative frequency distribution of a noise signal and the speech signal.

19 Claims, 8 Drawing Sheets

(51) Int. Cl.
*H04M 9/08* (2006.01)
*G10L 21/0364* (2013.01)
*G10L 21/0232* (2013.01)
*G10L 25/21* (2013.01)
*G10L 21/0264* (2013.01)
*G10L 25/06* (2013.01)
*H04R 3/02* (2006.01)
*G10L 21/0208* (2013.01)

(52) U.S. Cl.
CPC ............... *G10L 25/21* (2013.01); *H04M 9/08* (2013.01); *G10L 21/0264* (2013.01); *G10L 25/06* (2013.01); *G10L 2021/02082* (2013.01); *H04M 9/082* (2013.01); *H04R 3/02* (2013.01)

(56) References Cited

U.S. PATENT DOCUMENTS

| | | | |
|---|---|---|---|
| 7,117,145 B1* | 10/2006 | Venkatesh | G10L 21/0208 704/200 |
| 7,127,072 B2* | 10/2006 | Rademacher | G10L 21/0208 381/94.1 |
| 7,171,003 B1* | 1/2007 | Venkatesh | H03G 3/32 381/66 |
| 7,454,332 B2* | 11/2008 | Koishida | G10L 21/0208 381/94.3 |
| 8,046,218 B2* | 10/2011 | Allen | G10L 25/48 704/200.1 |
| 8,081,776 B2* | 12/2011 | Haulick | H03G 5/165 381/103 |
| 8,412,525 B2* | 4/2013 | Mukerjee | G10L 15/142 704/233 |
| 2004/0141608 A1* | 7/2004 | Imata | H04M 9/082 379/406.08 |
| 2008/0159559 A1* | 7/2008 | Akagi | G10L 21/0208 381/92 |
| 2008/0175375 A1* | 7/2008 | Ishiguro | H04B 3/234 379/406.08 |
| 2008/0219457 A1 | 9/2008 | Aarts et al. | |
| 2008/0255829 A1 | 10/2008 | Cheng | |
| 2009/0089053 A1* | 4/2009 | Wang | G10L 25/78 704/233 |
| 2009/0225980 A1 | 9/2009 | Schmidt et al. | |
| 2010/0211395 A1 | 8/2010 | Beerends et al. | |
| 2016/0019909 A1* | 1/2016 | Shi | H04M 9/082 704/226 |
| 2017/0061984 A1* | 3/2017 | Bocko | G10L 21/0264 |

FOREIGN PATENT DOCUMENTS

| | | |
|---|---|---|
| CN | 101582264 A | 11/2009 |
| CN | 101763858 A | 6/2010 |
| CN | 102510418 A | 6/2012 |
| CN | 102893331 A | 1/2013 |
| CN | 102984638 A | 3/2013 |
| CN | 103578479 A | 2/2014 |
| CN | 103606374 A | 2/2014 |
| CN | 104050971 A | 9/2014 |
| CN | 105280195 A | 1/2016 |
| KR | 20010072937 | 7/2001 |
| WO | WO 02/13572 A2 | 2/2002 |

OTHER PUBLICATIONS

Tencent Technology, IPRP, PCT/CN2016/083622, dated May 8, 2018, 9 pgs.
Zhou Jian et al: Whisper Intelligibility enhancement based on noise robust feature and SVM, Jounal of Southeast20120930 University English Edition, Abstract, downloaded Jun. 4, 2018, 6 pgs.
Yuan-Fu Liao et al.: Maximum intelligibility-based close-loop speech synthesis framework for noisy environments, Acoustic, Speech and 20131021 Signal Processing 2013 IEEE International conference, Abstract, downloaded Jun. 4, 2018, 2 pgs.
Tencent Technology, ISR, PCT/CN2016/083622, dated Aug. 17, 2016, 2 pgs.

* cited by examiner

SPEECH SIGNAL PROCESSING METHOD AND APPARATUS

RELATED APPLICATION

This application is a continuation-in-part of PCT Patent Application No. PCT/CN2016/083622, entitled "METHOD AND APPARATUS FOR PROCESSING VOICE SIGNAL" filed on May 27, 2016, which claims priority to Chinese Patent Application No. 201510741057.1, filed with the State Intellectual Property Office of the People's Republic of China on Nov. 4, 2015, and entitled "SPEECH SIGNAL PROCESSING METHOD AND APPARATUS", both of which are incorporated herein by reference in their entirety.

FIELD OF THE TECHNOLOGY

The present disclosure relates to the field of terminal technologies, and in particular, to a speech signal processing method and apparatus.

BACKGROUND OF THE DISCLOSURE

Speech intelligibility means a percentage that a user comprehends a speech signal transferred from a sound system. For example, if the user hears that the sound system transfers 100 words, but comprehends only 50 words, the speech intelligibility of the system is 50%. As a portable mobile terminal gradually becomes miniaturized, maximum sound power that can be output by the mobile terminal gradually decreases. Accordingly, the speech intelligibility during communication of the user using the mobile terminal is affected. The speech intelligibility is an important indicator in measuring performance of the mobile terminal. Therefore, how the mobile terminal processes a speech signal to improve the speech intelligibility becomes the key to the development of the mobile terminal.

Currently, in a typical acoustic application scenario including a mobile terminal, a user, and a noise source, a to-be-speech signal is detected by using an automatic gain control algorithm, a small signal in the to-be-speech signal is amplified, the amplified signal is converted into an electrical signal, and the electrical signal is transferred to a speaker. After being amplified, the electrical signal transferred to the speaker reaches a maximum value allowed by the speaker. When the speaker works based on maximum output power, the speaker outputs a speech signal at a maximum output sound pressure level.

In the implementation process of the present disclosure, the inventor finds that the related technology has at least the following problems:

Usually, the average fluctuation amplitude of the speech signal is far less than the peak fluctuation amplitude. During excitation by a normal speech signal, when working normally, a speaker whose maximum rated output power is 1 watt has average output power that is generally only approximately 10% of the maximum rated output power (that is, 0.1 W). In a normal working state, if the amplitude of the electrical signal that is input to the speaker is further increased, a signal part having large amplitude in the speech signal causes the speaker overloaded, resulting in saturated distortion, and decreasing the speech intelligibility and articulation. In addition, if only the small signal in the speech signal is amplified, an effective dynamic range of the speech signal is narrowed. Accordingly, the speech intelligibility cannot be significantly improved, either.

SUMMARY

To resolve the problem in the related technology, embodiments of the present application provide a speech signal processing method and apparatus. The technical solutions are as follows:

According to one aspect, a speech signal processing method is provided, including:

obtaining a recorded signal and a speech signal, the recorded signal including at least a noise signal and an echo signal;

calculating a loop transfer function according to the recorded signal and the speech signal;

calculating a power spectrum of the echo signal and a power spectrum of the noise signal according to the recorded signal, the speech signal, and the loop transfer function;

calculating a frequency weighted coefficient according to the power spectrum of the echo signal and the power spectrum of the noise signal;

adjusting a frequency amplitude of the speech signal based on the frequency weighted coefficient; and outputting the adjusted speech signal.

According to another aspect, a speech signal processing apparatus is provided, including:

at least one processor; and a memory, the memory storing a program instruction, and when executed by the processor, the instruction configuring the apparatus to perform the following operations:

obtaining a recorded signal and a speech signal, the recorded signal including at least a noise signal and an echo signal;

calculating a loop transfer function according to the recorded signal and the speech signal;

calculating a power spectrum of the echo signal and a power spectrum of the noise signal according to the recorded signal, the speech signal, and the loop transfer function;

calculating a frequency weighted coefficient according to the power spectrum of the echo signal and the power spectrum of the noise signal;

adjusting a frequency amplitude of the speech signal based on the frequency weighted coefficient; and outputting the adjusted speech signal.

The technical solutions provided in the embodiments of the present application bring beneficial effects as follows:

The frequency amplitude of a speech signal is automatically adjusted according to relative frequency distribution of a noise signal and the speech signal while ensuring that a speaker is not overloaded and dynamic amplitude of the original speech signal is not disrupted, which significantly improves the speech intelligibility.

BRIEF DESCRIPTION OF THE DRAWINGS

To describe the technical solutions of the embodiments of the present application more clearly, the accompanying drawings for illustrating the embodiments are described briefly in the following. Apparently, the drawings in the following description are only some embodiments of the present application, and a person skilled in the art may derive other drawings based on these accompanying drawings without creative efforts.

DESCRIPTION OF EMBODIMENTS

Figure 1:
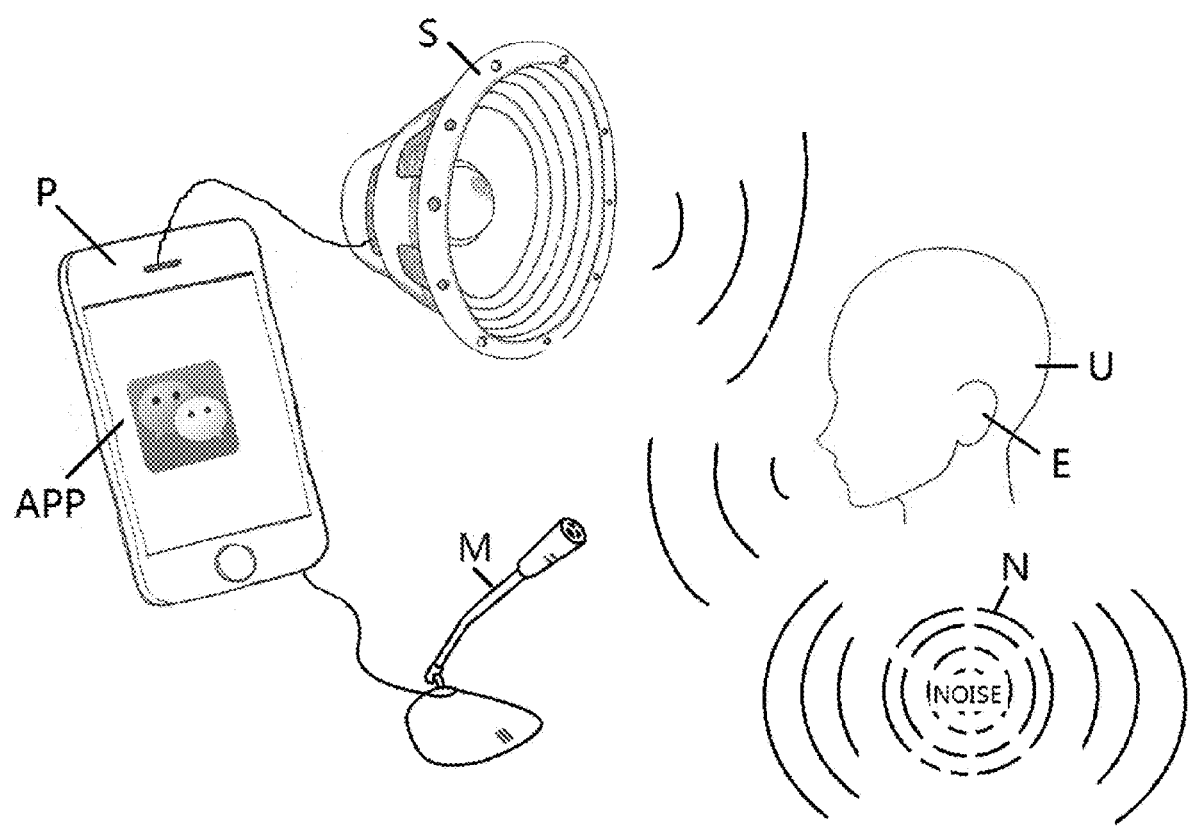
FIG. 1 is a schematic diagram of an implementation environment of a speech signal processing method according to an embodiment of the present application.

To make the objectives, technical solutions, and advantages of the present disclosure clearer, the following further describes in detail the embodiments of the present application with reference to the accompanying drawings. Apparently, the described embodiments are only some embodiments rather than all the embodiments of the present application. All other embodiments obtained by a person of ordinary skill in the art based on the embodiments of the present application without creative efforts shall fall within the protection scope of the present application.

A voice instant messaging application (App) is an application that can be used to make a voice over Internet Protocol call or a network voice conference, and is widely installed on mobile terminal devices such as a smartphone, a tablet computer, a notebook computer, and a wearable electronic product. As the mobile terminal gradually becomes miniaturized, maximum sound power that can be output by a micro speaker in the mobile terminal device encounters a bottleneck.

Main reasons that the maximum sound power that is output by the mobile terminal device encounters a bottleneck include the following two aspects:

In a first aspect, according to an existing electro-acoustic amplification technology, a sound wave is generated mainly depending on three parts: a power amplifier, a speaker, and a speaker box. The speaker in the mobile terminal device can implement electricity-to-sound conversion as efficient as possible only when the physical size of the speaker and the speaker box is in direct proportion to a wavelength of the sound wave. However, as a portable mobile device gradually becomes miniaturized, the size of the mobile terminal is usually far less than the wavelength of the sound wave. Using a sound wave whose wavelength is 340 Hz as an example, if to implement sound-to-electricity conversion as efficient as possible, the size of the mobile terminal needs to be at least one meter. Therefore, miniaturization of the speaker decreases the maximum sound power that is output by the mobile terminal. In addition, a moving coil speaker that is commonly used at present needs to have a certain thickness, to ensure that a diaphragm has sufficient motion space. However, as the mobile terminal gradually becomes miniaturized and thinner, the integral acoustic design in the mobile terminal is limited by the physical size. Consequently, the maximum sound power that is output by the mobile terminal is limited.

In a second aspect, the voice instant messaging App installed on the mobile terminal generally runs in an operating system, and hardware volume control needs to be implemented by using an application programming interface (API) provided by the operating system. In term of audio input and output, currently, a mainstream implementation method is as follows: The voice instant messaging App notifies the operating system that an audio configuration mode is required. The operating system configures related hardware. After the configuration is complete, the voice instant messaging App only needs to regularly write data corresponding to a speech signal to a recording API of the operating system, and then read the data from the recording API of the operating system. However, types of audio configure modes supported by the operating system are limited. The limited audio configuration modes are implemented by a mobile terminal manufacturer at a hardware bottom layer (firmware). Hardware output volume control of the App is limited by such a factor. In addition, a hardware vendor usually performs bottom layer audio optimization only for a normal usage scenario, and the mobile terminal manufacturer generally does not perform targeted optimization for a usage scenario in an extreme environment (for example, there is large ambient noise) (for example, the mobile terminal manufacturer generally does not provide a dedicated software interface that may increase the hardware output volume).

When arranged in descending order of output volumes, common mobile terminals are: notebook computer, tablet computer, smartphone (in hands-free mode), wearable device and the like. However, during communication using the mobile terminals, problems of ambient noise received by the mobile terminals change reversely: Usually, the notebook computer is frequently used indoors, and noise received by the notebook computer is mainly indoor low-decibel small noise; the tablet computer and the smartphone are frequently used outdoors like public places, and noise received by the tablet computer and the smartphone is mainly high-decibel large noise; the wearable device is long worn on the human body and is used in most noise scenarios, and noise received by the wearable device is most complex. As the mobile terminals gradually become miniaturized, the problems of ambient noise received by the mobile terminals are more obvious, which significantly affects user experience during communication using the mobile terminals.

To resolve the problem that maximum sound power that is output by the mobile terminal encounters a bottleneck, the embodiments of the present application provide a method in which the speech intelligibility of the mobile terminal is improved without changing hardware of the mobile terminal but by processing a speech signal. According to the method provided in the embodiments of the present application, even in a noisy scenario, a mobile terminal user can still clearly hear speech content of a peer end during a call.

FIG. 1 is a schematic diagram of an implementation environment of a speech signal processing method and apparatus according to an embodiment of the present application. Referring to FIG. 1, the implementation environment includes three acoustic entities: a mobile terminal P, a user U, and a noise source N, and further includes sound output and input devices: a speaker S and a microphone M. The mobile terminal P may be a mobile phone, a tablet computer, a notebook computer, a wearable device, or the like, on which one or more voice instant messaging Apps are installed. Based on the voice instant messaging Apps, the user may communicate with another user anytime and anywhere. The speaker S and the microphone M may be built in the mobile terminal, or may be connected to the mobile terminal as an external device, such as an external sound box, an external speaker, a Bluetooth speaker, or a Bluetooth headset. The microphone M may pick up sound in the entire scenario, including: noise emitted by the noise source N, the speaking voice of the user U, and sound played by the speaker S. When the user communicates with a user on a peer end by using voice instant messaging software, the mobile terminal receives a to-be-played speech signal (which is briefly referred to as a speech signal below for distinguishing) sent by the peer end. After being processed, the speech signal is converted by the speaker into a sound wave, and is transferred to the user U by air and is sensed by the user U. At the same time, a sound wave emitted by the noise source N is transferred to the user U and is also sensed by the user U. The sound wave emitted by the noise source N interferes with the user U, and lowers the speech intelligibility of the mobile terminal.

In the acoustic field, according to the psychoacoustic masking effect principle, when two signals close in frequency but greatly differed in amplitude appear at the same time, the signal with larger amplitude masks a signal with smaller amplitude. That is, when the noise emitted by the noise source N is strong, the user U cannot clearly hear speech content played by the speaker S. In this case, if to increase output power of the speaker S, the speaker S needs to have a larger physical size, which contradicts the design of miniaturization, lightening, and thinning of the mobile terminal. In view of this, in the present disclosure, the problem of interference caused by a noise signal to a speech signal is resolved by using the psychoacoustic masking effect.

Usually, the speech signal and the noise signal are not single-frequency signals, they respectively occupy different band ranges, and their energy distribution at frequencies is not uniform. A frequency, recorded as f_weak, at which energy is weakest in the noise signal may be found by comparing power spectrums of the speech signal and the noise signal. In this embodiment, under the condition that the output power of the speaker is not exceeded, the speech signal is played with energy concentrated near f_weak; in addition, energy of the speech signal that is far away from the frequency f_weak is attenuated, to prevent the speaker from being overloaded. In such a processing manner, at a frequency near f_weak, the noise signal is masked by the speech signal, and content of the speech signal is sensed by the user. At a frequency far away from f_weak, the speech signal is still masked by the noise signal. In conclusion, the enhanced speech signal masks the noise signal at some frequencies, so that the noise does not mask the entire speech signal, and in this case, the user may clearly hear the content of the speech signal.

Figure 2:
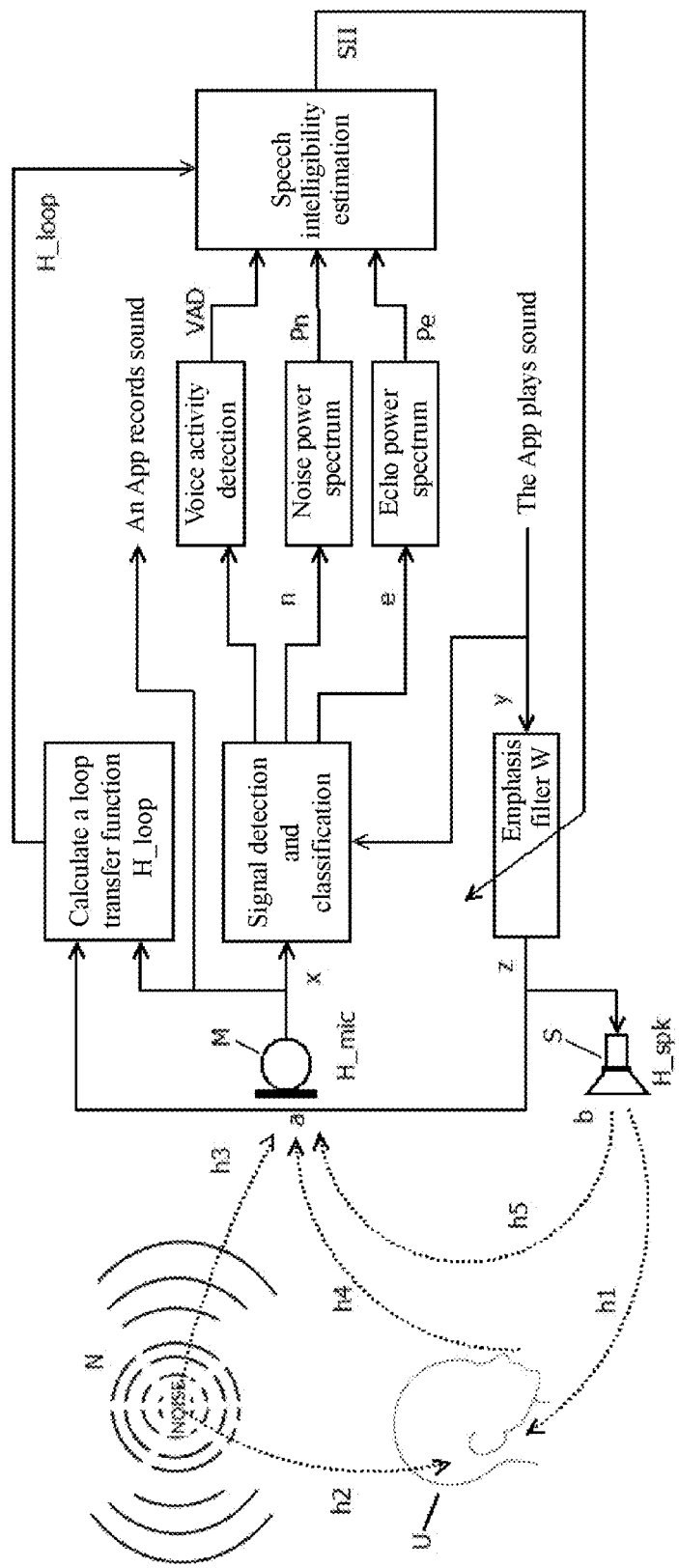
FIG. 2 is a diagram of a system architecture of a speech signal processing method according to another embodiment of the present application.

FIG. 2 is a diagram of a system architecture of a speech signal processing method according to the present application. Referring to FIG. 2, the system architecture includes a user U, a speaker S, a microphone M, and various functional modules. The functional modules include a signal detection and classification module, a spectrum estimation module, a loop transfer function calculation module, a speech intelligibility estimation module, and the like. The spectrum estimation module may specifically include a voice activity detection module, a noise power spectrum module, and an echo power spectrum module. Functions of the modules in the system and relationships between the modules are as follows:

The microphone M is configured to pick up ambient sound, referred to as a recorded signal (recorded as x) in this embodiment, and send the recorded signal x to the signal detection and classification module.

The signal detection and classification module is configured to detect and classify the recorded signal, and output three types of signals: a speech signal (recorded as a near-end signal v) when the user U speaks, a noise signal (recorded as a noise signal n) emitted by the noise source N, and a signal (recorded as an echo signal e) recorded by the microphone M when the speaker S plays sound.

The spectrum estimation module is configured to calculate a power spectrum of the noise signal, a power spectrum of the echo signal, and a power feature value of the near-end signal.

The power spectrum of the noise signal may be represented by $P_n$, the power spectrum of the echo signal may be represented by $P_e$, and the power feature value of the near-end signal may be represented by VAD_v. VAD_v has two states: true and false. When VAD_v=true, it indicates that there is a near-end signal at a current moment, that is, the user U is speaking; when VAD_v=false, it indicates that there is no near-end signal at a current moment, that is, the user U is not speaking, or the noise signal or the echo signal is apparently louder than the speaking voice of the user U.

The loop transfer function calculation module is configured to calculate a transfer function, recorded as H_loop, on a path "frequency weighted filter—speaker—sound field—microphone" according to a speech signal y and the recorded signal x that is detected by the microphone.

The speech intelligibility estimation module is configured to determine a speech intelligibility index (also known as "SII") according to H_loop, VAD_v, $P_n$, and $P_e$, and is further configured to calculate a frequency weighted coefficient of the frequency weighted filter W.

Referring to FIG. 2, specific spatial locations of the user, the mobile terminal, and the noise source cannot be determined during actual application, and the speech signal and the recorded signal are processed to maximize SII at an ear location of the user U rather than the location of the microphone M. To resolve the problem, in the method provided in this embodiment, approximation processing is applied. For ease of description below, in this embodiment of the present application, a length of a sound transfer path between the speaker S and an ear of the user U is represented by h1, a length of a sound transfer path between the noise source N and the user ear is represented by h2, a length of a sound transfer path between the noise source N and the microphone M is represented by h3, a length of a sound transfer path between the mouth of the user U and the microphone M is represented by h4, and a length of a sound transfer path between the microphone M and the speaker S is represented by h5. The approximation used in this embodiment of the present application is as follows:

(1). It is assumed that noise picked up by the microphone is approximately the same as noise sensed by the user, that is, h2≈h3.

(2). It is assumed that echo coming from the speaker and picked up by the microphone is approximately the same as sound played by the speaker and sensed by the user, that is, h1≈h5.

Under the condition that the foregoing approximation conditions are met, the problem of calculating maximum speech intelligibility at the location of the user U may be translated into a problem of calculating maximum speech intelligibility at the location of the microphone M.

All optional technical solutions above may be combined in any manner to form optional embodiments of the present disclosure. Details are not further described herein one by one.

Figure 3:
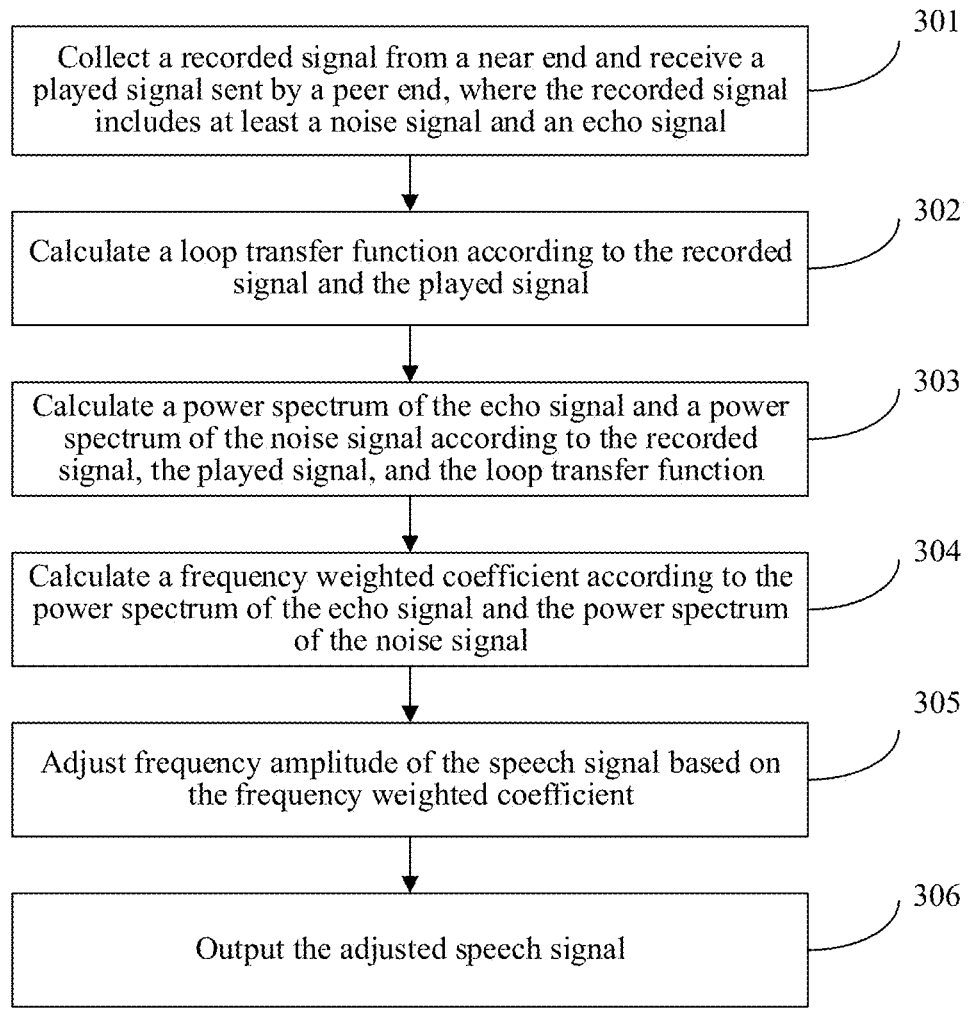
FIG. 3 is a flowchart of a speech signal processing method according to another embodiment of the present application.

FIG. 3 is a flowchart of a speech signal processing method according to an embodiment of the present application.

Referring to FIG. 3, the method provided in this embodiment includes the following steps:

301. Obtain a recorded signal and a speech signal, for example, collect a recorded signal from a near end and receive a speech signal (that is, a speech signal) sent by a peer end. The recorded signal includes at least a noise signal and an echo signal.

302. Calculate a loop transfer function according to the recorded signal and the speech signal.

303. Calculate a power spectrum of the echo signal and a power spectrum of the noise signal according to the recorded signal, the speech signal, and the loop transfer function.

304. Calculate a frequency weighted coefficient according to the power spectrum of the echo signal and the power spectrum of the noise signal.

305. Adjust a frequency amplitude of the speech signal based on the frequency weighted coefficient.

306. Output the adjusted speech signal.

According to the method provided in this embodiment of the present application, the frequency amplitude of a speech signal is automatically adjusted according to relative frequency distribution of a noise signal and the speech signal while ensuring that a speaker is not overloaded and dynamic amplitude of the original speech signal is not disrupted, which significantly improves the speech intelligibility.

In another embodiment of the present application, the calculating a loop transfer function according to the recorded signal and the speech signal includes:

calculating a frequency domain cross-correlation function between the recorded signal and the speech signal;

calculating a frequency domain autocorrelation function of the speech signal; and calculating the loop transfer function according to the frequency domain cross-correlation function between the recorded signal and the speech signal and the frequency domain autocorrelation function of the speech signal.

In another embodiment of the present application, a power spectrum of the recorded signal is calculated by applying the following formula to the recorded signal:

$$P_x = X(n)\char`\^2$$

where $P_x$ is the power spectrum of the recorded signal, $X(n)$ is a vector obtained by performing Fourier transform on a recorded signal collected at an $n^{th}$ moment, and $\char`\^2$ is used to obtain a square of each vector element in $X(n)$.

In another embodiment of the present application, the calculating a power spectrum of the echo signal and a power spectrum of the noise signal according to the recorded signal, the speech signal, and the loop transfer function includes:

calculating a power spectrum of the recorded signal;

calculating an estimated value of the echo signal according to the loop transfer function and the speech signal;

calculating a square of the estimated value of the echo signal, to obtain the power spectrum of the echo signal; and subtracting the power spectrum of the echo signal from the power spectrum of the recorded signal, to obtain the power spectrum of the noise signal.

In another embodiment of the present application, before the calculating a square of the estimated value of the echo signal, to obtain the power spectrum of the echo signal, the method further includes:

determining a power feature value indicative of whether a power of the recorded signal is greater than a first threshold, a power feature value indicative of whether a power of the speech signal is greater than a second threshold, and a power feature value indicative of whether a power of the echo signal is greater than a third threshold.

In another embodiment of the present application, before the subtracting the power spectrum of the echo signal from the power spectrum of the recorded signal, to obtain the power spectrum of the noise signal, the method further includes:

when the power of the recorded signal is less than the first threshold and the power of the echo signal is less than the third threshold, subtracting the power spectrum of the echo signal from the power spectrum of the recorded signal, to obtain the power spectrum of the noise signal.

In another embodiment of the present application, the calculating a frequency weighted coefficient according to the power spectrum of the echo signal and the power spectrum of the noise signal includes:

constructing a speech intelligibility index according to the power spectrum of the echo signal and the power spectrum of the noise signal; and under the condition that the power spectrum of the echo signal remains unchanged, obtaining the frequency weighted coefficient according to a maximum value of the speech intelligibility index.

Figure 4:
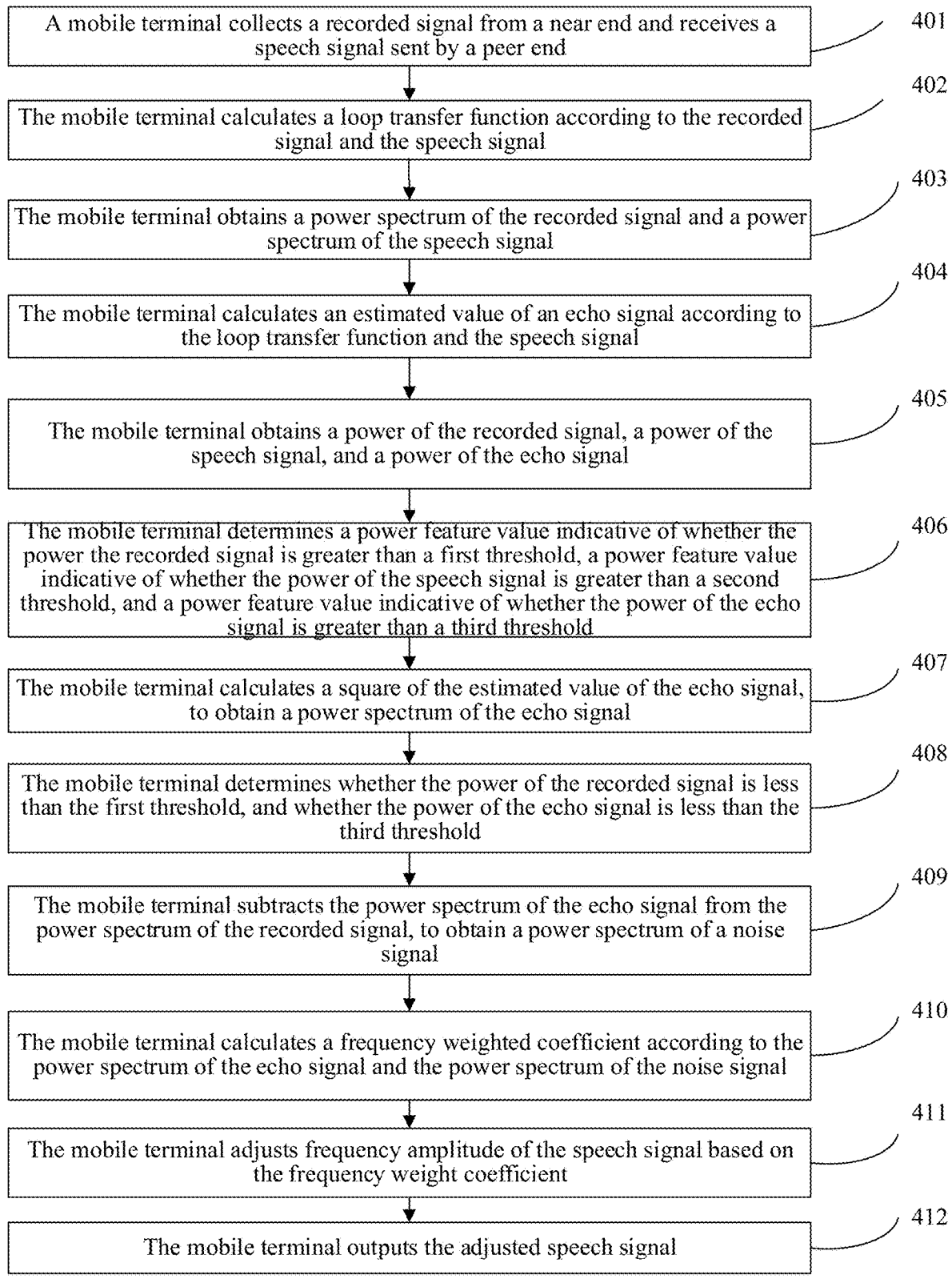
FIG. 4 is a flowchart of a speech signal processing method according to another embodiment of the present application.

FIG. 4 is a flowchart of a speech signal processing method according to another embodiment of the present application. Referring to FIG. 4, the method provided in this embodiment includes the following steps.

401. A mobile terminal collects a recorded signal from a near end and receives a speech signal sent by a peer end.

The near end is an environment in which the mobile terminal is currently located. A manner of collecting the recorded signal from the near end by the mobile terminal includes but not limited to: starting a microphone, collecting a sound signal in the current environment by using the microphone, and using the sound signal collected by the microphone as a recorded signal. The recorded signal includes a noise signal, an echo signal, a near-end signal, and the like. In this embodiment, the recorded signal may be represented by x, the noise signal may be represented by n, the echo signal may be represented by e, and the near-end signal may be represented by v.

The peer end collects a speech signal of a user on the peer end by using a microphone, and sends the collected speech signal to the mobile terminal by using a network after processing the collected speech signal. An instant messaging App on the mobile terminal receives the speech signal sent by the peer end, and uses the speech signal sent by the peer end as the speech signal. The peer end may be another mobile terminal communicating with the mobile terminal by using a voice instant messaging App. In this embodiment, the speech signal may be represented by y.

Optionally, to improve timeliness of using the voice instant messaging App, the microphone on the mobile terminal side collects a recorded signal once every preset time length, and the microphone on the peer end side also collects a speech signal once every preset time length, and sends the collected speech signal to the mobile terminal. The preset time length may be 10 milliseconds (ms), 20 ms, 50 ms, or the like.

In this embodiment, the recorded signal collected by the mobile terminal from the near end and the speech signal sent by the peer end are essentially time domain signals. For ease of calculation below, according to the method provided in this embodiment, the collected recorded signal and the received speech signal are further processed separately by using a method such as Fourier transform, to convert the recorded signal in the time domain form into a recorded signal in a frequency domain, and convert the speech signal in the time domain form into a speech signal in the frequency domain. In this embodiment, the recorded signal in the frequency domain form is a column vector with a vector length equal to the number of used Fourier transform points, and may be represented by X; the speech signal in the frequency domain form is also a column vector with a vector length also equal to the number of used Fourier transform points, and may be represented by Y.

Optionally, the recorded signal in the frequency domain form and the speech signal in the frequency domain form that are obtained after performing Fourier transform on the recorded signal and the speech signal in the time domain form have a same dimension.

402. The mobile terminal calculates a loop transfer function according to the recorded signal and the speech signal.

In this embodiment, when calculating the loop transfer function according to the recorded signal and speech signal, the mobile terminal may perform the following steps 4021 to 4023.

4021. The mobile terminal calculates a frequency domain cross-correlation function between the recorded signal and the speech signal.

The cross-correlation function is used to indicate a degree of correlation between the two signals. When obtaining the frequency domain cross-correlation function between the recorded signal and the speech signal, the mobile terminal may use the following formula <1>:

$$r\_xy = E[X \cdot {}^*Y] \qquad <1>$$

where r_xy is the cross-correlation function between the recorded signal and the speech signal, $E[\cdot]$ is an expected operator, and $\cdot^*$ is used to multiply vectors one by one on an element basis. For example, if $X=\{a_1, a_2, a_3, a_4\}$ and $Y=\{b_1, b_2, b_3, b_4\}$, $X \cdot {}^*Y=\{a_1 b_1, a_2 b_2, a_3 b_3, a_4 b_4\}$.

4022. The mobile terminal obtains a frequency domain autocorrelation function of the speech signal.

The autocorrelation function is used to indicate a degree of correlation between a signal and a delayed signal of the signal. When obtaining the frequency domain autocorrelation function of the speech signal, the mobile terminal may use the following formula <2>:

$$R\_yy = E[Y(n) {}^* Y'(n-k)] \qquad <2>$$

where R_yy is the frequency domain autocorrelation function of the speech signal, the symbol * represents a matrix multiplication operation, the symbol ' represents a conjugate transpose operation, $Y(n)$ is a vector obtained after performing Fourier transform on a speech signal collected at an $n^{th}$ moment, $Y(n-k)$ is a vector obtained after performing Fourier transform on a speech signal collected at an $(n-k)^{th}$ moment, $k=[0, K_{max}]$, $k \in Z$, that is, k is an integer, and a system order is determined by a value of $K_{max}$.

4023. Based on the frequency domain cross-correlation function between the recorded signal and the speech signal that is obtained in step 4021 and the frequency domain autocorrelation function of the speech signal that is obtained in step 4022, the mobile terminal may calculate the loop transfer function by applying the following formula <3>:

$$H\_loop = R\_yy^{-1} * r\_xy \qquad <3>$$

where H_loop is the loop transfer function, and the symbol ^-1 represents a matrix inverse operation.

403. The mobile terminal obtains a power spectrum of the recorded signal and a power spectrum of the speech signal.

The mobile terminal may calculate the power spectrum of the recorded signal by applying the following formula <4> to the recorded signal:

$$P_x X(n) \cdot {}^\wedge 2 \qquad <4>$$

where $P_x$ is the power spectrum of the recorded signal, $X(n)$ is a vector obtained by performing Fourier transform on a recorded signal collected at the $n^{th}$ moment, and $\cdot^\wedge 2$ is used to obtain a square of each vector element in $X(n)$.

For example, the recorded signal collected at the $n^{th}$ moment is $X(n)=\{a_1, a_2, a_3, \ldots, a_n\}$, and the mobile terminal may obtain $P_x=\{a_1^2, a_2^2, a_3^2, \ldots a_n^2\}$ by applying the formula $P_x=X(n) \cdot {}^\wedge 2$.

The mobile terminal may calculate the power spectrum of the speech signal by applying the following formula <5> to the speech signal:

$$P_y = Y(n) \cdot {}^\wedge 2 \qquad <5>$$

where $P_y$ is the power spectrum of the speech signal, $Y(n)$ is a vector obtained by performing Fourier transform on the speech signal collected at the $n^{th}$ moment, and $\cdot^\wedge 2$ is used to obtain a square of each vector element in $Y(n)$.

For example, the speech signal collected at the $n^{th}$ moment is $Y(n)=\{b_1, b_2, b_3, \ldots, b_n\}$, and the mobile terminal may obtain $P_y=\{b_1^2, b_2^2, b_3^2, \ldots, b_n^2\}$ by applying the formula $P_y=Y(n) \cdot {}^\wedge 2$.

404. The mobile terminal calculates an estimated value of an echo signal according to the loop transfer function and the speech signal.

The mobile terminal may calculate the estimated value of the echo signal according to the loop transfer function and the speech signal by applying the following formula <6>:

$$E(n) = \sum_{k=0}^{K_{max}} H\_loop(k) \cdot Y(n-k) \qquad (6)$$

where $E(n)$ is the estimated value of the echo signal.

405. The mobile terminal obtains a power of the recorded signal, a power of the speech signal, and a power of the echo signal.

The power of the recorded signal measures the power spectrum of the recorded signal, and may be obtained by processing the power spectrum of the recorded signal. In this embodiment, the power of the recorded signal may be represented by VAD_x. VAD_x is a two-value state, and has two states: true and false. When VAD_x=true, it indicates that the recorded signal is strong; when VAD_x=false, it indicates that the recorded signal is weak.

The power of the speech signal measures the power spectrum of the speech signal, and may be obtained by processing the power spectrum of the speech signal. In this embodiment, the power of the speech signal may be represented by VAD_y. VAD_y is a two-value state, and has two states: true and false. When VAD_y=true, it indicates that the speech signal is strong; when VAD_y=false, it indicates that the speech signal is weak.

The power of the echo signal measures a power spectrum of the echo signal. In this embodiment, the power of the echo signal may be represented by VAD_e. VAD_e is a two-value state, and has two states: true and false. When VAD_e=true, it indicates that the echo signal is strong; when VAD_e=false, it indicates that the echo signal is weak. It should be noted herein that, when the power of the echo signal is obtained, a power spectrum of the echo signal may be calculated in advance according to the estimated value of the echo signal, to obtain the power of the echo signal by processing the power spectrum of the echo signal. The power spectrum calculated herein of the echo signal is an estimated power spectrum of the echo signal. Whether a power spectrum of the echo signal is the power spectrum calculated herein of the echo signal needs to be further determined by performing the following step 406.

406. The mobile terminal determines a power feature value indicative of whether the power of the recorded signal is greater than a first threshold, a power feature value indicative of whether the power of the speech signal is greater than a second threshold, and a power feature value indicative of whether the power of the echo signal is greater than a third threshold. If yes, step 407 is performed.

To distinguish the noise signal and the near-end signal, in this embodiment, a signal detection and classification module and a voice activity detection mechanism are used to distinguish a near-end signal (including background noise) and a non-near-end signal based on time according to the power of the recorded signal, the power of the echo signal, and the power of the speech signal, to obtain a power spectrum of the noise signal. During specific determining, the mobile terminal needs to determine whether the power of the recorded signal is greater than the first threshold, whether the power of the speech signal is greater than the second threshold, and whether the power of the echo signal is greater than the third threshold. The first threshold, the second threshold, and the third threshold are preset thresholds. In this embodiment, the first threshold may be represented by Tx, the second threshold may be represented by Ty, and the third threshold may be represented by Te. Smaller values of the first threshold, the second threshold, and the third threshold indicate that the mobile terminal is more sensitive to noise. On the contrary, the mobile terminal reacts to noise only when the noise has large energy.

The determining process may be represented by the following formula <7>:

$$VAD\_y = \begin{cases} true & Py > Ty \\ flase & Py \le Ty \end{cases}$$

$$VAD\_x = \begin{cases} true & Px > Tx \\ flase & Px \le Tx \end{cases} \text{ and}$$

$$VAD\_e = \begin{cases} true & Pe > Te \\ flase & Pe \le Te \end{cases}$$

<7>

Generally, a recorded signal collected by the mobile terminal by using the microphone may not include a near-end signal. To further determine whether the recorded signal includes a near-end signal, the following formula <8> may be used for determining:

when $VAD\_y$=false and $VAD\_e$=false,$VAD\_v=VAD\_x$ <8>

That is, when the speaker of the mobile terminal does not play sound (that is, VAD_y=false), and no echo signal is detected (that is, VAD_e=false), a recorded signal collected by the microphone is a near-end signal, and in this case, the user is speaking. Otherwise, it indicates that the user is not speaking.

In the determining process, if it is determined that the power of the recorded signal is greater than the first threshold, the power of the speech signal is greater than the second threshold, and the power of the echo signal is greater than the third threshold, the following step 407 is performed. If it is determined that the power of the recorded signal is greater than the first threshold, the power of the speech signal is greater than the second threshold, the power of the echo signal is less than or equal to the third threshold; or the power of the recorded signal is greater than the first threshold, and the power of the speech signal is less than or equal to the second threshold, the recorded signal and the speech signal that are obtained this time are ignored.

407. The mobile terminal calculates a square of the estimated value of the echo signal, to obtain a power spectrum of the echo signal.

When the power of the recorded signal is greater than the first threshold, the power of the speech signal is greater than the second threshold, and the power of the echo signal is greater than the third threshold, the mobile terminal calculates the square of the estimated value of the echo signal, to obtain the power spectrum of the echo signal. The following formula <9> may be applied for specific calculation:

$$P_e = E(n)\hat{\,}2$$ <9> where $P_e$ is the power spectrum of the echo signal.

408. The mobile terminal determines whether the power of the recorded signal is less than the first threshold, and whether the power of the echo signal is less than the third threshold. If yes, step 409 is performed.

Based on step 407, the mobile terminal further determines whether the power of the recorded signal is less than the first threshold, and whether the power of the echo signal is less than the third threshold, to obtain the power spectrum of the noise signal.

In the determining process, if it is determined that the power of the recorded signal is less than the first threshold and the power of the echo signal is less than the third threshold, the following step 409 is performed. If it is determined that the power of the recorded signal is less than the first threshold and the power of the echo signal is greater than or equal to the third threshold, the recorded signal and the speech signal that are obtained this time are ignored.

409. The mobile terminal subtracts the power spectrum of the echo signal from the power spectrum of the recorded signal, to obtain a power spectrum of a noise signal.

When it is determined that the power of the recorded signal is less than the first threshold and the power of the echo signal is less than the third threshold, it may be considered that no near-end signal is detected, that is, the user is not speaking. In this case, the mobile terminal subtracts the power spectrum of the echo signal from power spectrum of the recorded signal, to obtain the power spectrum of the noise signal. During specific implementation, refer to the following formula <10>:

$$P_n = P_x - P_e$$ <10> where $P_n$ is the power spectrum of the noise signal.

410. The mobile terminal calculates a frequency weighted coefficient according to the power spectrum of the echo signal and the power spectrum of the noise signal.

When calculating the frequency weighted coefficient according to the power spectrum of the echo signal and the power spectrum of the noise signal, the mobile terminal may perform the following steps 4101 to 4102.

4101: The mobile terminal constructs a speech intelligibility index according to the power spectrum of the echo signal and the power spectrum of the noise signal.

In the acoustic field, the speech intelligibility index (SII) has multiple standards. In this embodiment, the standard-4 in ASNI-53.5 is used for calculation. In the standard-4, the speech intelligibility index may be represented as a function using the power spectrum of the echo signal and the power spectrum of the noise signal as independent variables. Therefore, after the mobile terminal calculates the power spectrum of the echo signal and the power spectrum of the noise signal, the speech intelligibility index may be constructed. For the constructed speech intelligibility index, refer to the following formula <11>:

$$SII(Pe_i, Pn_i) = \sum_{i=1}^{i_{max}} I_i \cdot \min \quad \langle 11 \rangle$$

$$\left\{ 1 - \frac{(Pe_i - Pu_i - 10)}{160}, 1 \right\} \cdot \min\left(1, \max\left(0, \frac{(Pe_i - Pd_i + 15)}{30}\right)\right)$$

where $i_{max}$ is the total number of divided bands, i is any band in $i_{max}$, SII is the speech intelligibility index, $Pe_i$ is a power spectrum of the echo signal in an $i^{th}$ band, $Pn_i$ is a power spectrum of the noise signal in the $i^{th}$ band, $Pu_i$ is a power spectrum of standard-strength voice in the $i^{th}$ band, $I_i$ is a band division weight, and $Pd_i$ is an intermediate variable, may be represented by the following formula <12>:

$$Pd_i = 10 \cdot \log_{10}\left( 10^{\frac{Pn_i}{10}} + \sum_{k}^{i-1} 10^{\frac{\max\{Pn_k, Pe_k - 24\} + 3.32 C_k \log\left(0.89 \frac{f_i}{f_k}\right)}{10}} \right) \quad i \neq 0 \quad \langle 12 \rangle$$

$$\max\{Pn_k, Pe_k - 24\} \quad i = 0$$

where $f_k$ represents a $k^{th}$ frequency in the $i^{th}$ band, and $C_k$ is an intermediate variable, and may be represented by the following formula <13>:

$$C_k = 0.6(\max\{Pn_k, Pe_k - 24\} + 10 \log_{10} f_k - 6.353) - 80 \quad \langle 13 \rangle$$

where $Pe_k$ is a power spectrum of the echo signal at the $k^{th}$ frequency, and $Pn_k$ is a power spectrum of the noise signal at the $k^{th}$ frequency.

It should be noted that, for specific values of $Pu_i$ and $I_i$, refer to numbers specified in the standard [4] in ANSI-S3.5, or the values may be determined by design personnel as required.

4102: Under the condition that the power spectrum of the echo signal remains unchanged, the mobile terminal calculates a maximum value of the speech intelligibility index, to obtain the frequency weighted coefficient.

In this embodiment, the frequency weighted coefficient is a coefficient of a frequency weighted filter in the mobile terminal, and is used to adjust the frequency amplitude of a speech signal that is output by the mobile terminal. Frequency emphasis coefficients calculated by the mobile terminal at different moments are different.

It may be seen upon observation of the speech intelligibility index constructed in step 4101 that, the speech intelligibility index is a function using the power spectrum of the echo signal and the power spectrum of the noise signal as independent variables, that is, the speech intelligibility index has two variables. In this case, it is difficult to calculate the maximum value of the speech intelligibility index. Accordingly, in the method provided in this embodiment, approximate calculation is performed. It is assumed that the power spectrum of the noise signal at the $n^{th}$ moment is approximately equal to a power spectrum of the noise signal at the $(n-1)^{th}$ moment. In this way, when calculating a frequency weighted coefficient at the $n^{th}$ moment, the mobile terminal may directly use the power spectrum of the noise signal calculated at the $(n-1)^{th}$ moment. In such a processing manner, the mobile terminal converts the speech intelligibility index into a function using the power spectrum of the echo signal as an independent variable.

To improve speech intelligibility of a speech signal played by the speaker to the user, before playing the speech signal by using the speaker, the mobile terminal further uses the frequency weighted filter to process the speech signal, to increase amplitude of the speech signal at a specified frequency, and increase energy of the speech signal. As limited by the size of the mobile terminal, maximum sound power of the speaker during playing has a maximum value. To prevent the speaker from being overloaded, in this embodiment, when the frequency weighted coefficient is calculated based on the constructed speech intelligibility index, it is assumed that the power spectrum of the echo signal remains unchanged before and after enhancement of the frequency weighted filter, and then the maximum value of the speech intelligibility index is calculated. Such a method is mathematically referred to as an extremum solution in a constraint condition. The extremum solution may be represented by the following formula <14>:

$$\max \sum_i SII(Pe_i, Pn_i) \quad \langle 14 \rangle$$

$$\sum_i Pe'_i = \sum_i Pe_i$$

where $Pe_i$ is a power spectrum of the echo signal at an $i^{th}$ frequency before enhancement, $Pe'_i$ is a power spectrum of the echo signal at the $i^{th}$ frequency after enhancement, and the formula $$\sum_i Pe'_i = \sum_i Pe_i$$

ensures that the power spectrum of the echo signal remains unchanged before and after enhancement, thereby ensuring that the speaker is not overloaded.

It should be noted that, after a signal processed by the frequency weighted filter, an electrical signal is obtained, and the electrical signal needs to be converted by the speaker into a sound wave. Speakers of mobile terminals of different models make different output frequency responses. If to obtain output frequency responses of speakers of different mobile terminals, a speaker of each mobile terminal needs to be measured, and corrected and compensated during operation. Therefore, a hardware fragmentation problem is caused. To avoid the problem, in the method provided in this embodiment, the following method is used to omit direct measurement on a frequency response of the speaker.

It may be found upon observation of the formula <6> that, a mapping relationship between E(n) and Y(n) may be established by using the loop transfer function $H_{\_loop}$. In this embodiment, a frequency response of the speaker is recorded as $H_{spk}$, a frequency response of the microphone is recorded as $H_{mic}$, and according to formula <6>, the following formula may be obtained:

$$Pe = Py \cdot |H_{\_loop}|^2 = Pz \cdot |H_{spk}|^2 \cdot |H_{mic}|^2 = Pz \cdot \frac{|H_{\_loop}|^2}{|W|^2} \quad \langle 15 \rangle$$

For the formula <15>, extremum solution of the formula <14> may be translated into partial derivative solution. An inflection point of the speech intelligibility index may be obtained by calculating a partial derivative of the formula <15>. For a specific process, refer to the following formula <16>:

$$\frac{\partial SII}{\partial Pe_i} = 0 \Rightarrow \frac{\partial SII}{\partial\left(P_{z_i} \cdot \frac{|H_{loop}|^2}{|W|^2}\right)} = 0 \Rightarrow \frac{\partial SII}{\partial\left(P_{y_i} \cdot |W|^2 \cdot \frac{|H_{loop}|^2}{|W|^2}\right)} = \quad (16)$$

$$0 \Rightarrow \frac{\partial SII}{\partial(P_{y_i} \cdot |H_{loop}|^2)} = 0 \Rightarrow \frac{\partial SII}{\partial(P_{y_i} \cdot |H_{spk}|^2 \cdot |H_{mic}|^2 \cdot |W|^2)} = 0$$

where $|W|^2$ is the frequency weighted coefficient, $|H_{\_loop}|^2$ may be obtained by using the formula <3>, $Py_i$ may be obtained by using the formula <5>, and SIT may be obtained by using the formula <11>.

$|W|^2$ at the current moment may be obtained by calculating the formula <16>.

411. The mobile terminal adjusts a frequency amplitude of the speech signal based on the frequency weighted coefficient.

The mobile terminal dynamically traces and adjusts the speech intelligibility index based on the determined frequency weighted coefficient, to automatically adapt to changes in the power spectrum $P_n$ of the noise signal and the power spectrum $P_e$ of the echo signal.

412. The mobile terminal outputs the adjusted speech signal.

To improve accuracy of a speech signal that is output by the mobile terminal at the current moment, the mobile terminal determines, according to the following formula <17> in combination with a speech signal that is output before the current moment and a corresponding frequency weighted coefficient, the speech signal that is output at the current moment:

$$z(n) = \sum_{k=0}^{K_{max}} w(k) \cdot y(n-k) \quad (17)$$

where $z(n)$ is an output speech signal, $w(k)$ is a value in a time domain and corresponding to a frequency weighted coefficient calculated at the $n^{th}$ moment, $K_{max}$ is equal to an order of the frequency weighted filter W, and $y(n-k)$ is a value of the speech signal at the $(n-k)^{th}$ moment before emphasis.

In this step, the adjusted speech signal that is output by the mobile terminal can mask the noise signal. Therefore, when the adjusted speech signal is played, the user can clearly hear content of the speech signal.

Figure 5:
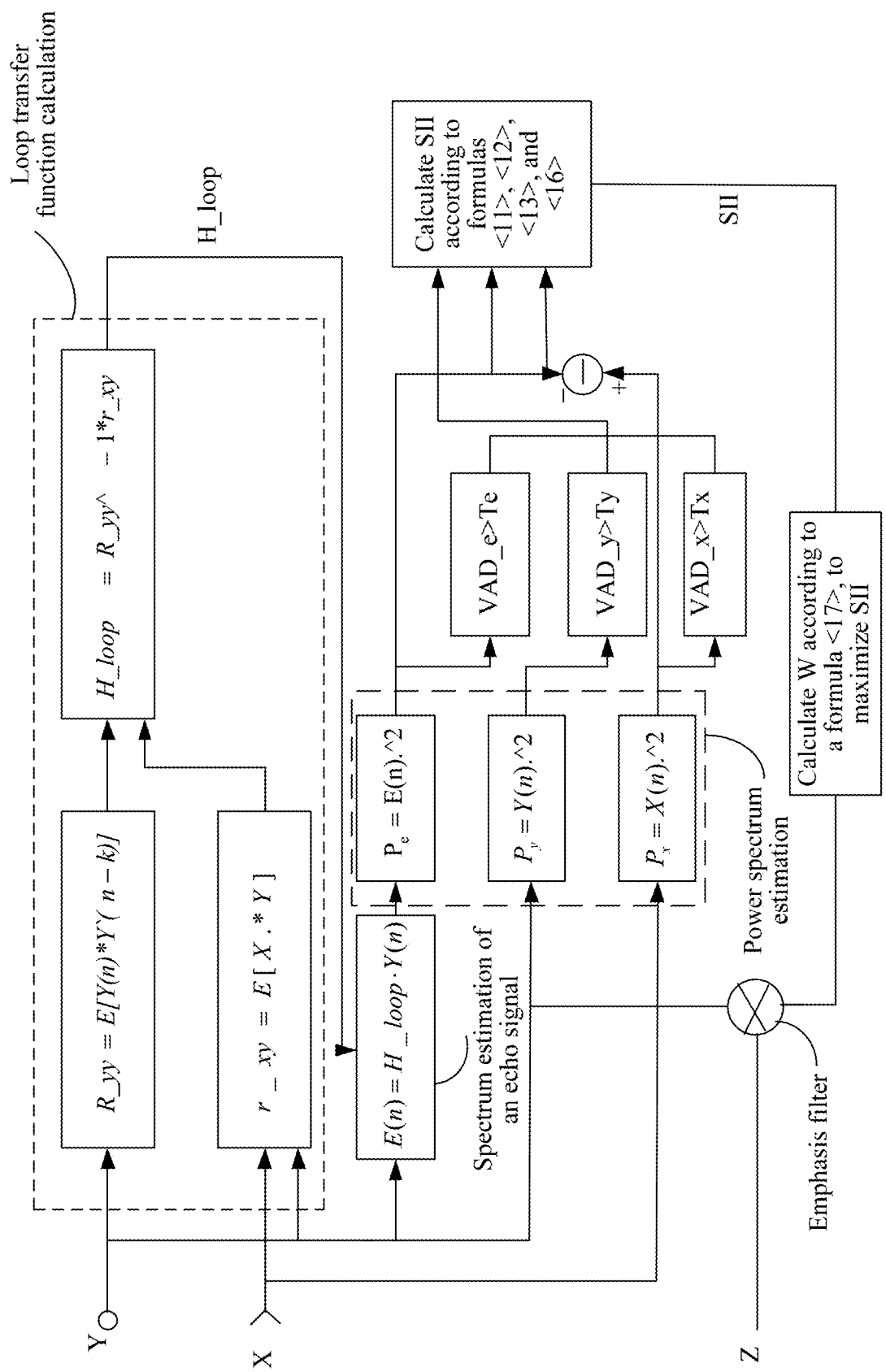
FIG. 5 is a schematic diagram of a signal flow corresponding to a speech signal processing method according to another embodiment of the present application.

FIG. 5 shows a signal flow corresponding to a speech signal processing method according to an embodiment of the present application. As shown in FIG. 5, based on an obtained recorded signal X and speech signal Y, a mobile terminal may calculate a loop transfer function H_loop=R_yy^-1*r_xy according to a frequency domain cross-correlation function r_xy between the recorded signal and the speech signal and a frequency domain autocorrelation function R_yy of the speech signal. The mobile terminal may calculate an estimated value E(n)=H_loop·Y(n) of an echo signal according to the speech signal and the loop transfer function. Further, the mobile terminal calculates a power spectrum of the echo signal and a power spectrum of a noise signal according to a power of the recorded signal, a power of the speech signal, and a power of the echo signal by using a voice activity detection mechanism, then calculates a maximum value of a speech intelligibility index, to obtain a frequency weighted coefficient, and finally adjusts the frequency amplitude of the speech signal based on the frequency weighted coefficient by using a frequency weighted filter, and outputs the adjusted speech signal.

Figure 6:
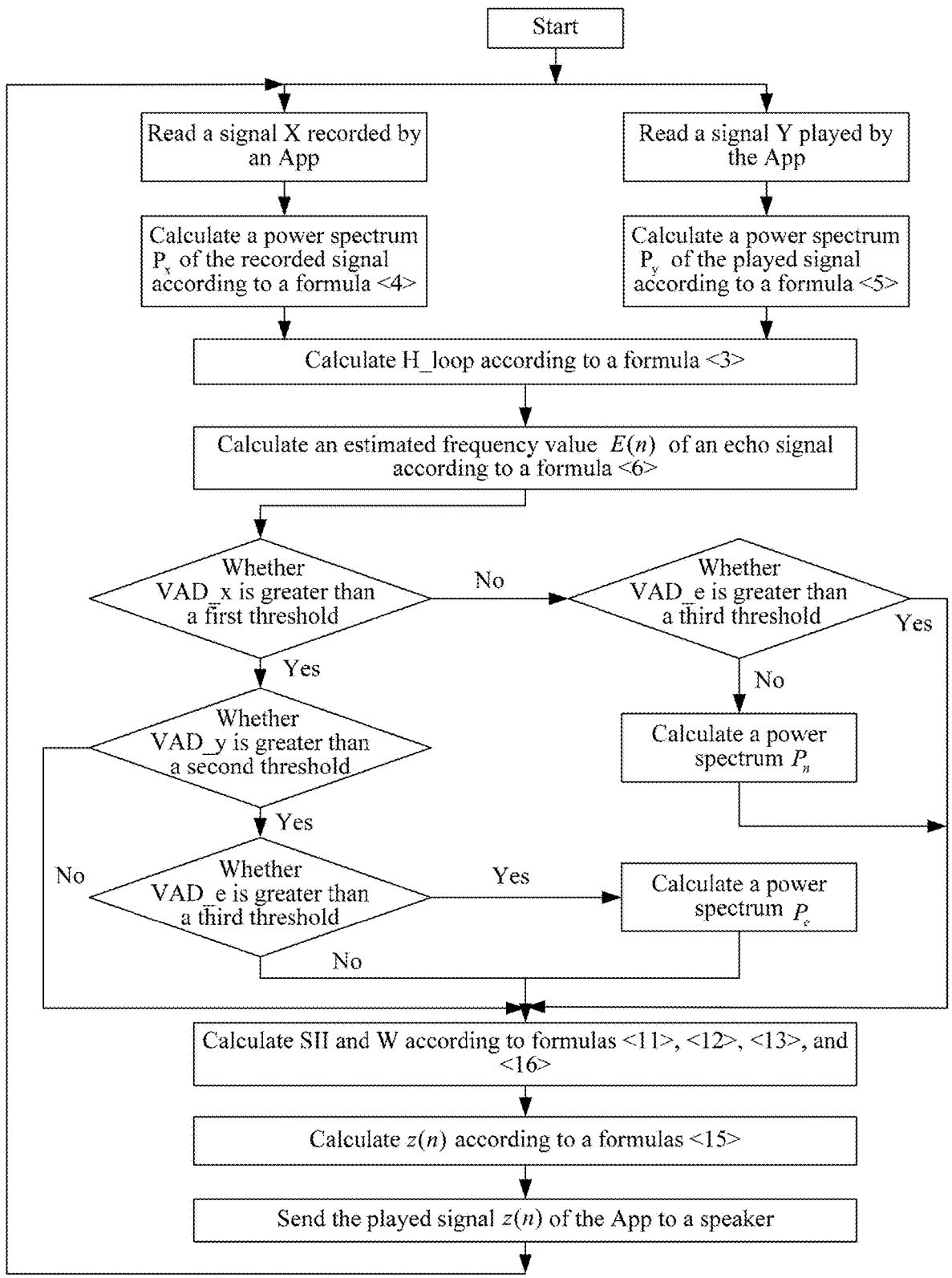
FIG. 6 is a flowchart of a speech signal processing method according to another embodiment of the present application.

FIG. 6 is a flowchart of a speech signal processing method according to another embodiment of the present application. The method may be implemented by software. When a voice instant messaging App is started, a mobile terminal regularly obtains a recorded signal x collected by a microphone from a near end and a speech signal y sent by a peer end, calculates a power spectrum $P_x$ of the recorded signal and a power spectrum $P_y$ of the speech signal, and calculates a loop transfer function H_loop based on the foregoing formula <3>. After determining the loop transfer function, the mobile terminal may calculate an estimated value E(n) of an echo signal according to the foregoing formula <6>. In addition, the echo signal, the near-end speech signal, and a noise signal are picked up by the same microphone, and overlap in time. Therefore, the recorded signal needs to be classified, to calculate an echo power spectrum $P_e$ according to the foregoing formula <9>, and calculate a noise power spectrum $P_n$ according to the foregoing formula <10>. Next, a speech intelligibility index SII is constructed according to the power spectrum of the echo signal and the power spectrum of the noise signal, and a frequency spectrum emphasis coefficient W may be obtained by calculating a maximum value of the speech intelligibility index SII. Finally, an enhanced speech signal is calculated according to the foregoing formula <17> and is output to a speaker, and converted by the speaker into sound for playing.

It should be noted that, the method may be implemented at a voice instant messaging App level, or may be implemented at an operating system level, or may be built into firmware of a hardware chip. The speech signal processing method provided in this embodiment of the present application is applicable to each of the three levels, and the only difference lies in a level in a mobile terminal system at which a same speech signal processing method is specifically run.

It should be noted that, the present disclosure is described by using a mobile terminal as an example, and a person skilled in the art may understand that, the present disclosure may also be applied to another terminal device, such as a desktop computer. In addition, the foregoing speech signal may be received from a peer end. For example, a terminal device receives a speech signal from another terminal device (that is, a peer device) by using a wireless or wired network. Alternatively, the speech signal may be a speech signal locally stored in the terminal device. Besides, the foregoing description is provided by using a voice instant messaging App as an example, and a person skilled in the art may understand that, the foregoing voice instant messaging App may be replaced with any other voice playing App.

It should be noted that, the method not only may be used to improve the speech intelligibility, but also may be used to improve an audio signal of other content. For example, a ringtone or an alert tone of an alarm may be automatically enhanced according to different ambient noise, so that the enhanced alert sound can be heard by a user more clearly, to overcome interference from ambient noise.

It should be noted that, in addition to being applied to a noise scenario, the method may be further applied to a non-noise environment. For example, A and B are close and are in calls at the same time. A is talking with a, and B is talking with b. Because A and B are close, the speaking voice of A interferes with listening of B, and the speaking voice of B also interferes with listening of A. The method provided in the present disclosure may also be used in such a voice contention scenario. In the scenario, a mobile terminal on the A side uses the voice of B as a noise signal, and uses the voice of a as a signal needing to be enhanced; similarly, a mobile terminal on the B side uses the voice of A as a noise signal, and uses the voice of b as a signal needing to be enhanced.

According to the method provided in this embodiment of the present application, the frequency amplitude of a speech signal is automatically adjusted according to relative frequency distribution of a noise signal and the speech signal while ensuring that a speaker is not overloaded and dynamic amplitude of the original speech signal is not disrupted, which significantly improves the speech intelligibility.

Figure 7:
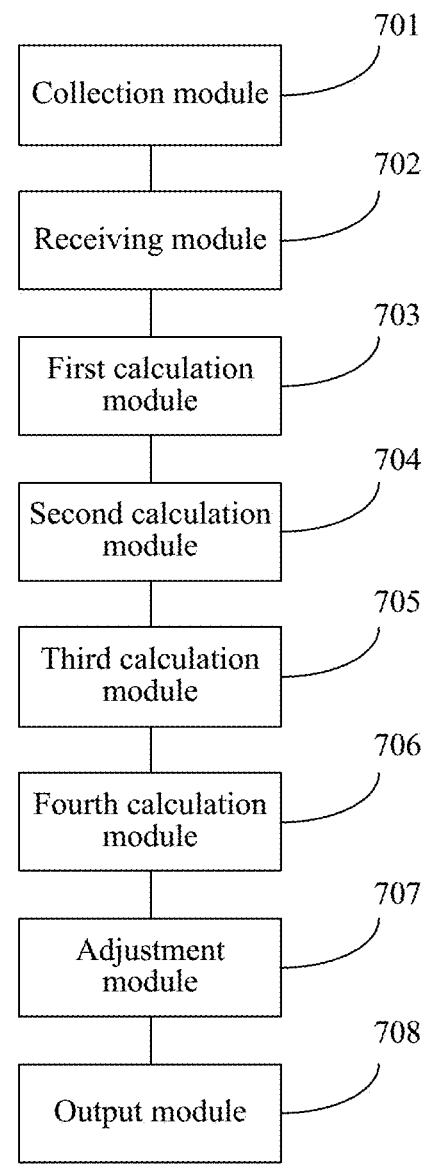
FIG. 7 is a schematic structural diagram of a speech signal processing apparatus according to another embodiment of the present application.

Referring to FIG. 7, an embodiment of the present application provides a schematic structural diagram of a speech signal processing apparatus. The apparatus includes:

a collection module 701, configured to collect a recorded signal from a near end, where the recorded signal includes at least a noise signal and an echo signal;

a receiving module 702, configured to receive a speech signal sent by a peer end;

a first calculation module 703, configured to calculate a loop transfer function according to the recorded signal and the speech signal;

a second calculation module 704, configured to calculate a power spectrum of the recorded signal;

a third calculation module 705, configured to calculate a power spectrum of the echo signal and a power spectrum of the noise signal according to the power spectrum of the recorded signal, the speech signal, and the loop transfer function;

a fourth calculation module 706, configured to calculate a frequency weighted coefficient according to the power spectrum of the echo signal and the power spectrum of the noise signal;

an adjustment module 707, configured to adjust a frequency amplitude of the speech signal based on the frequency weighted coefficient; and an output module 708, configured to output the adjusted speech signal.

In another embodiment of the present application, the first calculation module 703 is configured to calculate a frequency domain cross-correlation function between the recorded signal and the speech signal; calculate a frequency domain autocorrelation function of the speech signal; and calculate the loop transfer function according to the frequency domain cross-correlation function between the recorded signal and the speech signal and the frequency domain autocorrelation function of the speech signal.

In another embodiment of the present application, the second calculation module 704 is configured to calculate the power spectrum of the recorded signal by applying the following formula to the recorded signal:

$$P = X(n).\hat{\ }2$$

where $P_x$ is the power spectrum of the recorded signal, $X(n)$ is a vector obtained by performing Fourier transform on a recorded signal collected at an $n^{th}$ moment, and $.\hat{\ }2$ is used to obtain a square of each vector element in $X(n)$.

In another embodiment of the present application, the third calculation module 705 is configured to calculate an estimated value of the echo signal according to the loop transfer function and the speech signal; calculate a square of the estimated value of the echo signal, to obtain the power spectrum of the echo signal; and subtract the power spectrum of the echo signal from the power spectrum of the recorded signal, to obtain the power spectrum of the noise signal.

In another embodiment of the present application, the apparatus further includes:

a fifth calculation module, configured to calculate a power of the recorded signal, a power of the speech signal, and a power of the echo signal; and a first determining module, configured to determine a power feature value indicative of whether a power of the recorded signal is greater than a first threshold, a power feature value indicative of whether a power of the speech signal is greater than a second threshold, and a power feature value indicative of whether a power of the echo signal is greater than a third threshold; and the third calculation module 705 is configured to: when the power of the recorded signal is greater than the first threshold, the power of the speech signal is greater than the second threshold, and the power of the echo signal is greater than the third threshold, calculate the square of the estimated value of the echo signal, to obtain the power spectrum of the echo signal.

In another embodiment of the present application, the apparatus further includes:

a second determining module, configured to determine whether the power of the recorded signal is less than the first threshold, and whether the power of the echo signal is less than the third threshold; and the third calculation module 705 is configured to: when the power of the recorded signal is less than the first threshold and the power of the echo signal is less than the third threshold, subtract the power spectrum of the echo signal from the power spectrum of the recorded signal, to obtain the power spectrum of the noise signal.

In another embodiment of the present application, the fourth calculation module 706 is configured to construct a speech intelligibility index according to the power spectrum of the echo signal and the power spectrum of the noise signal; and under the condition that the power spectrum of the echo signal remains unchanged, obtain the frequency weighted coefficient according to a maximum value of the speech intelligibility index.

In conclusion, according to the apparatus provided in this embodiment of the present application, the frequency amplitude of a speech signal is automatically adjusted according to relative frequency distribution of a noise signal and the speech signal while ensuring that a speaker is not overloaded and dynamic amplitude of the original speech signal is not disrupted, which significantly improves the speech intelligibility.

Figure 8:
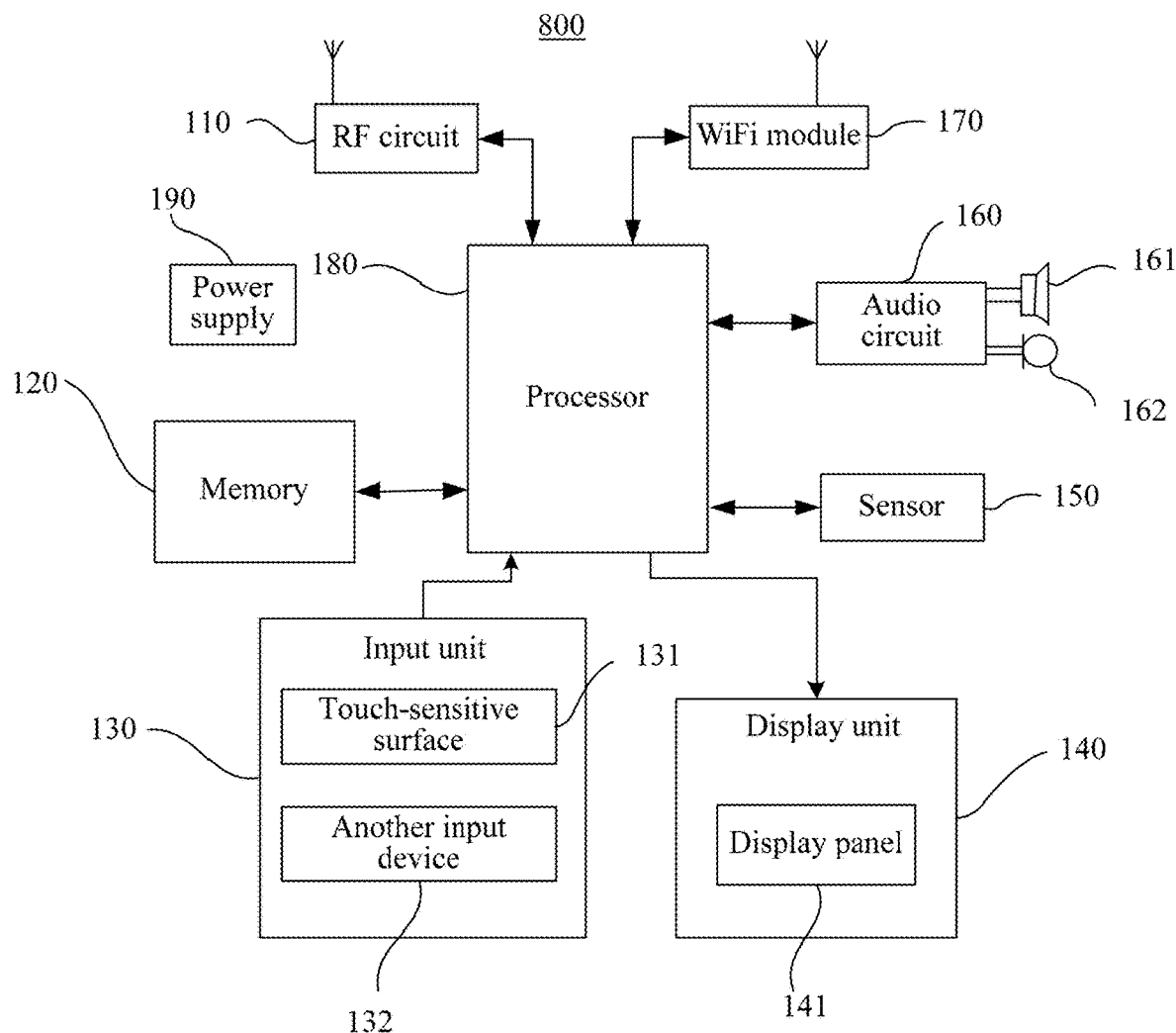
FIG. 8 is a schematic structural diagram of a speech signal processing terminal according to another embodiment of the present application.

Referring to FIG. 8, FIG. 8 is a schematic structural diagram of a speech signal processing terminal according to an embodiment of the present application. The terminal may be configured to implement the speech signal processing method provided in the foregoing embodiment. Specifically:

The terminal 800 may include components such as a radio frequency (RF) circuit 110, a memory 120 including one or more computer readable storage media, an input unit 130, a display unit 140, a sensor 150, an audio circuit 160, a wireless fidelity (WiFi) module 170, a processor 180 including one or more processing cores, and a power supply 190. A person skilled in the art may understand that the structure of the terminal shown in FIG. 8 does not constitute a limitation to the terminal, and the terminal may include more or fewer components than those shown in the figure, or some components may be combined, or a different component deployment may be used.

The RF circuit 110 may be configured to receive and send signals during an information receiving and sending process or a call process. Particularly, the RF circuit 110 receives downlink information from a base station, then delivers the downlink information to the processor 180 for processing, and sends related uplink data to the base station. Usually, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by means of wireless communication. The wireless communication may use any communications standard or protocol, including but not limited to Global System for Mobile communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function). The data storage area may store data (such as audio data and an address book) created according to use of the terminal 800. In addition, the memory 120 may include a high speed random access memory, and may also include a non-volatile memory, such as at least one magnetic disk storage device, a flash memory, or another volatile solid-state storage device. Correspondingly, the memory 120 may further include a memory controller, so as to provide access of the processor 180 and the input unit 130 to the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touchscreen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch direction of the user, detects a signal generated by the touch operation, and transfers the signal to the touch controller. The touch controller receives touch information from the touch detection apparatus, converts the touch information into touch point coordinates, and then sends the touch point coordinates to the processor 180. Moreover, the touch controller can receive and execute a command sent from the processor 180. In addition, the touch-sensitive surface 131 may be may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user ports of the terminal 800. The graphical user ports may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although in FIG. 8, the touch-sensitive surface 131 and the display panel 141 are used as two separate parts to implement input and output functions, in some embodiments, the touch-sensitive surface 131 and the display panel 141 may be integrated to implement the input and output functions.

The terminal 800 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 800 is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone gesture (such as switchover between horizontal and vertical screens, a related game, and gesture calibration of a magnetometer), a related function of vibration identification (such as a pedometer and a knock). Other sensor, such as a gyroscope, a barometer, a hygrometer, a thermometer, and an Infrared sensor, which may be configured in the terminal 800 are not further described herein.

The audio circuit 160, a speaker 161, and a microphone 162 may provide audio interfaces between the user and the terminal 800. The audio circuit 160 may transmit, to the speaker 161, a received electric signal converted from received audio data. The speaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal, by using the RF circuit 110, or outputs the audio data to the memory 120 for further processing. The audio circuit 160 may further include an earplug jack, so as to provide communication between a peripheral earphone and the terminal 800.

WiFi belongs to a short distance wireless transmission technology. The terminal 800 may help, by using the WiFi unit 170, a user to receive and send an email, browse a web page, and access stream media, and the like, which provides wireless broadband Internet access for the user. Although FIG. 8 shows the WiFi module 170, it may be understood that, the WiFi module does not belong to a necessary constitution of the terminal 800, and can be ignored according to demands without changing the scope of the essence of the present application.

The processor 180 is a control center of the terminal 800, and connects to various parts of the mobile phone by using various interfaces and lines. By running or executing the software program and/or module stored in the memory 120, and invoking data stored in the memory 120, the processor 180 performs various functions and data processing of the terminal 800, thereby performing overall monitoring on the mobile phone. Optionally, the processor 180 may include one or more processing cores. Optionally, the processor 180 may integrate an application processor and a modem. The application processor mainly processes an operating system, a user interface, an application program, and the like. The modem mainly processes wireless communication. It may be understood that the foregoing modem processor may not be integrated into the processor 180.

The terminal 800 further includes the power supply 190 (such as a battery) for supplying power to the components. Preferably, the power supply may logically connect to the processor 180 by using a power supply management system, thereby implementing functions, such as charging, discharging, and power consumption management, by using the power supply management system. The power supply 190 may further include one or more of a direct current or alternating current power supply, a re-charging system, a power failure detection circuit, a power supply converter or inverter, a power supply state indicator, and any other components.

Although not shown in the figure, the terminal 800 may further include a camera, a Bluetooth module, and the like, which are not further described herein. Specifically, in this embodiment, the display unit of the terminal 800 is a touchscreen display, and the terminal 800 further includes a memory and one or more programs. The one or more programs are stored in the memory and configured to be executed by one or more processors.

The one or more programs include an instruction used for performing the following operations:

obtaining a recorded signal and a speech signal, the recorded signal including at least a noise signal and an echo signal;

calculating a loop transfer function according to the recorded signal and the speech signal;

calculating a power spectrum of the echo signal and a power spectrum of the noise signal according to the recorded signal, the speech signal, and the loop transfer function;

calculating a frequency weighted coefficient according to the power spectrum of the echo signal and the power spectrum of the noise signal;

adjusting a frequency amplitude of the speech signal based on the frequency weighted coefficient; and outputting the adjusted speech signal.

Assuming that the foregoing is a first possible implementation, in a second possible implementation provided on the basis of the first possible implementation, the recorded signal is a sound signal collected by using the microphone of the terminal device.

In a third possible implementation provided on the basis of the second possible implementation, the outputting the adjusted speech signal includes playing the adjusted speech signal by using the speaker of the terminal device. The speech signal is a speech signal that is received by the terminal device by using a network or that is locally stored and is to be played by using the speaker.

In a fourth possible implementation provided on the basis of the third possible implementation, the memory of the terminal further includes an instruction for performing the following operations:

the calculating a loop transfer function according to the recorded signal and the speech signal includes:

calculating a frequency domain cross-correlation function between the recorded signal and the speech signal;

calculating a frequency domain autocorrelation function of the speech signal; and calculating the loop transfer function according to the frequency domain cross-correlation function between the recorded signal and the speech signal and the frequency domain autocorrelation function of the speech signal; or the memory of the terminal further includes an instruction for performing the following operations:

calculating a power spectrum of the recorded signal, including:

calculating the power spectrum of the recorded signal by applying the following formula to the recorded signal:

$$P_x = X(n)\char`\^2$$

where $P_x$ is the power spectrum of the recorded signal, $X(n)$ is a vector obtained by performing Fourier transform on a recorded signal collected at an $n^{th}$ moment, and $\char`\^2$ is used to obtain a square of each vector element in $X(n)$.

In a fifth possible implementation provided on the basis of the third possible implementation, the memory of the terminal further includes an instruction for performing the following operations:

the calculating a power spectrum of the echo signal and a power spectrum of the noise signal according to the recorded signal, the speech signal, and the loop transfer function includes:

calculating a power spectrum of the recorded signal;

calculating an estimated value of the echo signal according to the loop transfer function and the speech signal;

calculating a square of the estimated value of the echo signal, to obtain the power spectrum of the echo signal; and subtracting the power spectrum of the echo signal from the power spectrum of the recorded signal, to obtain the power spectrum of the noise signal.

In a sixth possible implementation provided on the basis of the fifth possible implementation, the memory of the terminal further includes an instruction for performing the following operations:

before the calculating a square of the estimated value of the echo signal, to obtain the power spectrum of the echo signal, calculating a power of the recorded signal, a power of the speech signal, and a power of the echo signal;

determining a power feature value indicative of whether a power of the recorded signal is greater than a first threshold, a power feature value indicative of whether a power of the speech signal is greater than a second threshold, and a power feature value indicative of whether a power of the echo signal is greater than a third threshold; and when the power of the recorded signal is greater than the first threshold, the power of the speech signal is greater than the second threshold, and the power of the echo signal is greater than the third threshold, performing the step of calculating a square of the estimated value of the echo signal, to obtain the power spectrum of the echo signal.

In a seventh possible implementation provided on the basis of the sixth possible implementation, the memory of the terminal further includes an instruction for performing the following operations:

before the subtracting the power spectrum of the echo signal from the power spectrum of the recorded signal, to obtain the power spectrum of the noise signal, determining whether the power of the recorded signal is less than the first threshold, and whether the power of the echo signal is less than the third threshold; and when the power of the recorded signal is less than the first threshold and the power of the echo signal is less than the third threshold, perform the step of subtracting the power spectrum of the echo signal from the power spectrum of the recorded signal, to obtain the power spectrum of the noise signal.

In an eighth possible implementation provided on the basis of the third possible implementation, the memory of the terminal further includes an instruction for performing the following operations:

the calculating a frequency weighted coefficient according to the power spectrum of the echo signal and the power spectrum of the noise signal includes:

constructing a speech intelligibility index according to the power spectrum of the echo signal and the power spectrum of the noise signal; and under the condition that the power spectrum of the echo signal remains unchanged, obtaining the frequency weighted coefficient according to a maximum value of the speech intelligibility index.

According to the terminal provided in this embodiment of the present application, the frequency amplitude of a speech signal is automatically adjusted according to relative frequency distribution of a noise signal and the speech signal while ensuring that a speaker is not overloaded and dynamic amplitude of the original speech signal is not disrupted, which significantly improves the speech intelligibility.

An embodiment of the present application further provides a computer readable storage medium. The computer readable storage medium may be a computer readable storage medium included in the memory in the foregoing embodiment, or may be a computer readable storage medium that exists alone and is not assembled into a terminal. The computer readable storage medium stores one or more programs. The one or more programs are executed by one or more processors to perform a speech signal processing method. The method includes:

obtaining a recorded signal and a speech signal, the recorded signal including at least a noise signal and an echo signal;

calculating a loop transfer function according to the recorded signal and the speech signal;

calculating a power spectrum of the echo signal and a power spectrum of the noise signal according to the recorded signal, the speech signal, and the loop transfer function;

calculating a frequency weighted coefficient according to the power spectrum of the echo signal and the power spectrum of the noise signal;

adjusting a frequency amplitude of the speech signal based on the frequency weighted coefficient; and outputting the adjusted speech signal.

Assuming that the foregoing is a first possible implementation, in a second possible implementation provided on the basis of the first possible implementation, the recorded signal is a sound signal collected by using the microphone of the terminal device.

In a third possible implementation provided on the basis of the second possible implementation, the outputting the adjusted speech signal includes playing the adjusted speech signal by using a speaker. The speech signal is a speech signal that is received by a terminal device by using a network or that is locally stored and is to be played by using the speaker.

In a fourth possible implementation provided on the basis of the third possible implementation, the memory of the terminal further includes an instruction for performing the following operations:

the calculating a loop transfer function according to the recorded signal and the speech signal includes:

calculating a frequency domain cross-correlation function between the recorded signal and the speech signal;

calculating a frequency domain autocorrelation function of the speech signal; and calculating the loop transfer function according to the frequency domain cross-correlation function between the recorded signal and the speech signal and the frequency domain autocorrelation function of the speech signal; or the memory of the terminal further includes an instruction for performing the following operations:

calculating a power spectrum of the recorded signal, including:

calculating the power spectrum of the recorded signal by applying the following formula to the recorded signal:

$$P_x = X(n)\hat{\ }2$$

where $P_x$ is the power spectrum of the recorded signal, $X(n)$ is a vector obtained by performing Fourier transform on a recorded signal collected at an $n^{th}$ moment, and $\hat{\ }2$ is used to obtain a square of each vector element in $X(n)$ In a fifth possible implementation provided on the basis of the third possible implementation, the memory of the terminal further includes an instruction for performing the following operations:

the calculating a power spectrum of the echo signal and a power spectrum of the noise signal according to the recorded signal, the speech signal, and the loop transfer function includes:

calculating a power spectrum of the recorded signal;

calculating an estimated value of the echo signal according to the loop transfer function and the speech signal;

calculating a square of the estimated value of the echo signal, to obtain the power spectrum of the echo signal; and subtracting the power spectrum of the echo signal from the power spectrum of the recorded signal, to obtain the power spectrum of the noise signal.

In a sixth possible implementation provided on the basis of the fifth possible implementation, the memory of the terminal further includes an instruction for performing the following operations:

before the calculating a square of the estimated value of the echo signal, to obtain the power spectrum of the echo signal, obtaining a power of the recorded signal, a power of the speech signal, and a power of the echo signal;

determining a power feature value indicative of whether a power of the recorded signal is greater than a first threshold, a power feature value indicative of whether a power of the speech signal is greater than a second threshold, and a power feature value indicative of whether a power of the echo signal is greater than a third threshold; and when the power of the recorded signal is greater than the first threshold, the power of the speech signal is greater than the second threshold, and the power of the echo signal is greater than the third threshold, performing the step of calculating a square of the estimated value of the echo signal, to obtain the power spectrum of the echo signal.

In a seventh possible implementation provided on the basis of the sixth possible implementation, the memory of the terminal further includes an instruction for performing the following operations:

before the subtracting the power spectrum of the echo signal from the power spectrum of the recorded signal, to obtain the power spectrum of the noise signal, determining whether the power of the recorded signal is less than the first threshold, and whether the power of the echo signal is less than the third threshold; and when the power of the recorded signal is less than the first threshold and the power of the echo signal is less than the third threshold, performing the step of subtracting the power spectrum of the echo signal from the power spectrum of the recorded signal, to obtain the power spectrum of the noise signal.

In an eighth possible implementation provided on the basis of the third possible implementation, the memory of the terminal further includes an instruction for performing the following operations:

the calculating a frequency weighted coefficient according to the power spectrum of the echo signal and the power spectrum of the noise signal includes:

constructing a speech intelligibility index according to the power spectrum of the echo signal and the power spectrum of the noise signal; and under the condition that the power spectrum of the echo signal remains unchanged, obtaining the frequency weighted coefficient according to a maximum value of the speech intelligibility index.

According to the computer readable storage medium provided in this embodiment of the present application, the frequency amplitude of a speech signal is automatically adjusted according to relative frequency distribution of a noise signal and the speech signal while ensuring that a speaker is not overloaded and dynamic amplitude of the original speech signal is not disrupted, which significantly improves the speech intelligibility.

An embodiment of the present application provides a graphics user interface. The graphics user interface is used on a speech signal processing terminal, the speech signal processing terminal includes a touch display, a memory, and one or more processors configured to execute one or more programs, and the graphics user interface includes:

obtaining a recorded signal and a speech signal, the recorded signal including at least a noise signal and an echo signal;

calculating a loop transfer function according to the recorded signal and the speech signal;

calculating a power spectrum of the echo signal and a power spectrum of the noise signal according to the recorded signal, the speech signal, and the loop transfer function;

calculating a frequency weighted coefficient according to the power spectrum of the echo signal and the power spectrum of the noise signal;

adjusting a frequency amplitude of the speech signal based on the frequency weighted coefficient; and outputting the adjusted speech signal.

According to the graphics user interface provided in this embodiment of the present application, the frequency amplitude of a speech signal is automatically adjusted according to relative frequency distribution of a noise signal and the speech signal while ensuring that a speaker is not overloaded and dynamic amplitude of the original speech signal is not disrupted, which significantly improves the speech intelligibility.

It should be noted that, speech signal processing of the speech signal processing apparatus provided in the foregoing embodiment is described by using only the foregoing division of the functional modules as an example. In practical application, the foregoing functions may be allocated to and completed by different functional modules as required, that is, an inner structure of the speech signal processing apparatus is divided into different functional modules, so as to complete all or some of the functions described above. In addition, the speech signal processing apparatus provided in the foregoing embodiment is based on the same conception as the speech signal processing method. For a specific implementation process thereof, refer to the method embodiment, and details are not described herein again.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present application, but are not intended to limit the present disclosure. Any modification, equivalent replacement, or improvement made within the spirit and principle of the present disclosure shall fall within the protection scope of the present disclosure.

What is claimed is:

1. A speech signal processing method performed at a terminal device having one or more processors, a microphone, a speaker, and memory storing one or more programs to be executed by the one or more processors, the method comprising:

receiving a to-be-output speech signal transmitted from another terminal device to the terminal device via a network;

obtaining a signal recorded by the microphone, the recorded signal including a noise signal and an echo signal, wherein the noise signal is detected from a near-end environment and the echo signal is detected from the speaker;

before outputting the speech signal via the speaker:
calculating a loop transfer function according to the recorded signal and the speech signal, wherein the loop transfer function indicates a correlation between the recorded signal and the speech signal;
calculating a power spectrum of the echo signal and a power spectrum of the noise signal according to the recorded signal, the speech signal, and the loop transfer function;
calculating a frequency weighted coefficient according to the power spectrum of the echo signal and the power spectrum of the noise signal, wherein the frequency weighted coefficient corresponds to a weakest frequency at which the noise signal has lowest energy;
adjusting a frequency amplitude of the speech signal based on the frequency weighted coefficient by increasing the frequency amplitude of the speech signal at the weakest frequency using the frequency weighted coefficient; and after adjusting the frequency amplitude of the speech signal:
outputting the adjusted speech signal via the speaker.

2. The method according to claim 1, wherein the operation of calculating a loop transfer function according to the recorded signal and the speech signal comprises:
calculating a frequency domain cross-correlation function between the recorded signal and the speech signal;
calculating a frequency domain autocorrelation function of the speech signal; and
calculating the loop transfer function according to the frequency domain cross-correlation function between the recorded signal and the speech signal and the frequency domain autocorrelation function of the speech signal.

3. The method according to claim 1, wherein the operation of calculating a power spectrum of the echo signal and a power spectrum of the noise signal according to the recorded signal, the speech signal, and the loop transfer function comprises:
calculating a power spectrum of the recorded signal;
calculating the power spectrum of the echo signal according to the loop transfer function and the speech signal; and
subtracting the power spectrum of the echo signal from the power spectrum of the recorded signal, to obtain the power spectrum of the noise signal.

4. The method according to claim 3, wherein the operation of calculating the power spectrum of the echo signal according to the loop transfer function and the speech signal comprises:
calculating a power of the recorded signal, a power of the speech signal, and a power of the echo signal; and
determining at least one of a power feature value indicative of whether the power of the recorded signal is greater than a first threshold, a power feature value indicative of whether the power of the speech signal is greater than a second threshold, and a power feature value indicative of whether the power of the echo signal is greater than a third threshold.

5. The method according to claim 4, wherein the operation of subtracting the power spectrum of the echo signal from the power spectrum of the recorded signal, to obtain the power spectrum of the noise signal comprises:
when the power of the recorded signal is less than the first threshold and the power of the echo signal is less than the third threshold, subtracting the power spectrum of the echo signal from the power spectrum of the recorded signal, to obtain the power spectrum of the noise signal.

6. The method according to claim 1, wherein the operation of calculating a frequency weighted coefficient according to the power spectrum of the echo signal and the power spectrum of the noise signal comprises:
constructing a speech intelligibility index according to the power spectrum of the echo signal and the power spectrum of the noise signal; and
under the condition that the power spectrum of the echo signal remains unchanged, obtaining the frequency weighted coefficient according to a maximum value of the speech intelligibility index.

7. The method according to claim 1, wherein the terminal device comprises a frequency weighted filter, and the frequency weighted coefficient indicates a ratio of the speech signal that is detected by the microphone after the speech signal passes through the frequency weighted filter and the speaker.

8. A terminal device, comprising:
at least one processor;
a microphone;
a speaker;
memory; and
a plurality of program instructions that, when executed by the at least one processor, cause the terminal device to perform the following operations:
receiving a to-be-output speech signal transmitted from another terminal device to the terminal device via a network;
obtaining a signal recorded by the microphone, the recorded signal including a noise signal and an echo signal, wherein the noise signal is detected from a near-end environment and the echo signal is detected from the speaker;
before outputting the speech signal via the speaker:
calculating a loop transfer function according to the recorded signal and the speech signal, wherein the loop transfer function indicates a correlation between the recorded signal and the speech signal;
calculating a power spectrum of the echo signal and a power spectrum of the noise signal according to the recorded signal, the speech signal, and the loop transfer function;
calculating a frequency weighted coefficient according to the power spectrum of the echo signal and the power spectrum of the noise signal, wherein the frequency weighted coefficient corresponds to a weakest frequency at which the noise signal has lowest energy;
adjusting a frequency amplitude of the speech signal based on the frequency weighted coefficient by increasing the frequency amplitude of the speech signal at the weakest frequency using the frequency weighted coefficient; and
after adjusting the frequency amplitude of the speech signal:
outputting the adjusted speech signal via the speaker.

9. The terminal device according to claim 8, wherein the operation of calculating a loop transfer function according to the recorded signal and the speech signal comprises:
calculating a frequency domain cross-correlation function between the recorded signal and the speech signal;
calculating a frequency domain autocorrelation function of the speech signal; and
calculating the loop transfer function according to the frequency domain cross-correlation function between the recorded signal and the speech signal and the frequency domain autocorrelation function of the speech signal.

10. The terminal device according to claim 8, wherein the operation of calculating a power spectrum of the echo signal and a power spectrum of the noise signal according to the recorded signal, the speech signal, and the loop transfer function comprises:
calculating a power spectrum of the recorded signal;
calculating the power spectrum of the echo signal according to the loop transfer function and the speech signal; and
subtracting the power spectrum of the echo signal from the power spectrum of the recorded signal, to obtain the power spectrum of the noise signal.

11. The terminal device according to claim 10, wherein the operation of calculating the power spectrum of the echo signal according to the loop transfer function and the speech signal comprises:
calculating a power of the recorded signal, a power of the speech signal, and a power of the echo signal; and
determining at least one of a power feature value indicative of whether the power of the recorded signal is greater than a first threshold, a power feature value indicative of whether the power of the speech signal is greater than a second threshold, and a power feature value indicative of whether the power of the echo signal is greater than a third threshold.

12. The terminal device according to claim 11, wherein the operation of subtracting the power spectrum of the echo signal from the power spectrum of the recorded signal, to obtain the power spectrum of the noise signal comprises:

when the power of the recorded signal is less than the first threshold and the power of the echo signal is less than the third threshold, subtracting the power spectrum of the echo signal from the power spectrum of the recorded signal, to obtain the power spectrum of the noise signal.

13. The terminal device according to claim 8, wherein the operation of calculating a frequency weighted coefficient according to the power spectrum of the echo signal and the power spectrum of the noise signal comprises:

constructing a speech intelligibility index according to the power spectrum of the echo signal and the power spectrum of the noise signal; and under the condition that the power spectrum of the echo signal remains unchanged, obtaining the frequency weighted coefficient according to a maximum value of the speech intelligibility index.

14. A non-transitory computer readable storage medium in connection with a terminal device having one or more processors, a microphone, and a speaker, the storage medium storing a plurality of program instructions that, when executed by the one or more processors, cause the terminal device to perform the following operations:

receiving a to-be-output speech signal transmitted from another terminal device to the terminal device via a network;

obtaining a signal recorded by the microphone, the recorded signal including a noise signal and an echo signal, wherein the noise signal is detected from a near-end environment and the echo signal is detected from the speaker;

before outputting the speech signal via the speaker:

calculating a loop transfer function according to the recorded signal and the speech signal, wherein the loop transfer function indicates a correlation between the recorded signal and the speech signal;

calculating a power spectrum of the echo signal and a power spectrum of the noise signal according to the recorded signal, the speech signal, and the loop transfer function;

calculating a frequency weighted coefficient according to the power spectrum of the echo signal and the power spectrum of the noise signal, wherein the frequency weighted coefficient corresponds to a weakest frequency at which the noise signal has lowest energy;

adjusting a frequency amplitude of the speech signal based on the frequency weighted coefficient by increasing the frequency amplitude of the speech signal at the weakest frequency using the frequency weighted coefficient; and after adjusting the frequency amplitude of the speech signal:

outputting the adjusted speech signal via the speaker.

15. The non-transitory computer readable storage medium according to claim 14, wherein the operation of calculating a loop transfer function according to the recorded signal and the speech signal comprises:

calculating a frequency domain cross-correlation function between the recorded signal and the speech signal;

calculating a frequency domain autocorrelation function of the speech signal; and calculating the loop transfer function according to the frequency domain cross-correlation function between the recorded signal and the speech signal and the frequency domain autocorrelation function of the speech signal.

16. The non-transitory computer readable storage medium according to claim 14, wherein the operation of calculating a power spectrum of the echo signal and a power spectrum of the noise signal according to the recorded signal, the speech signal, and the loop transfer function comprises:

calculating a power spectrum of the recorded signal;

calculating the power spectrum of the echo signal according to the loop transfer function and the speech signal; and subtracting the power spectrum of the echo signal from the power spectrum of the recorded signal, to obtain the power spectrum of the noise signal.

17. The non-transitory computer readable storage medium according to claim 16, wherein the operation of calculating the power spectrum of the echo signal according to the loop transfer function and the speech signal comprises:

calculating a power of the recorded signal, a power of the speech signal, and a power of the echo signal; and determining at least one of a power feature value indicative of whether the power of the recorded signal is greater than a first threshold, a power feature value indicative of whether the power of the speech signal is greater than a second threshold, and a power feature value indicative of whether the power of the echo signal is greater than a third threshold.

18. The non-transitory computer readable storage medium according to claim 17, wherein the operation of subtracting the power spectrum of the echo signal from the power spectrum of the recorded signal, to obtain the power spectrum of the noise signal comprises:

when the power of the recorded signal is less than the first threshold and the power of the echo signal is less than the third threshold, subtracting the power spectrum of the echo signal from the power spectrum of the recorded signal, to obtain the power spectrum of the noise signal.

19. The non-transitory computer readable storage medium according to claim 14, wherein the operation of calculating a frequency weighted coefficient according to the power spectrum of the echo signal and the power spectrum of the noise signal comprises:

constructing a speech intelligibility index according to the power spectrum of the echo signal and the power spectrum of the noise signal; and under the condition that the power spectrum of the echo signal remains unchanged, obtaining the frequency weighted coefficient according to a maximum value of the speech intelligibility index.

* * * * *